US011942698B2

(12) United States Patent
Leung et al.

(10) Patent No.: US 11,942,698 B2
(45) Date of Patent: Mar. 26, 2024

(54) ELECTRICALLY SMALL, PLANAR, HORIZONTALLY POLARIZED DUAL-BAND OMNIDIRECTIONAL ANTENNA

(71) Applicant: City University of Hong Kong, Kowloon (HK)

(72) Inventors: Kwok Wa Leung, Kowloon Tong (HK); Peng Fei Hu, Kowloon Tong (HK); Yong Mei Pan, Guangzhou (CN); Shao Yong Zheng, Guangzhou (CN)

(73) Assignee: City University of Hong Kong, Kowloon (HK)

( * ) Notice: Subject to any disclaimer, the term of this patent is extended or adjusted under 35 U.S.C. 154(b) by 51 days.

(21) Appl. No.: 17/685,777

(22) Filed: Mar. 3, 2022

(65) Prior Publication Data

US 2022/0302587 A1 Sep. 22, 2022

Related U.S. Application Data

(60) Provisional application No. 63/163,416, filed on Mar. 19, 2021.

(51) Int. Cl.

*H01Q 7/00* (2006.01)
*H01Q 5/307* (2015.01)
*H01Q 5/378* (2015.01)
*H01Q 9/28* (2006.01)
*H01Q 21/20* (2006.01)
*H01Q 21/28* (2006.01)

(52) U.S. Cl.

CPC ............ *H01Q 5/307* (2015.01); *H01Q 5/378* (2015.01); *H01Q 7/00* (2013.01); *H01Q 9/285* (2013.01); *H01Q 21/205* (2013.01); *H01Q 21/28* (2013.01)

(58) Field of Classification Search

CPC .......... H01Q 7/00; H01Q 9/065; H01Q 9/285; H01Q 21/205

See application file for complete search history.

(56) References Cited

U.S. PATENT DOCUMENTS

2012/0249396 A1* 10/2012 Parsche .................. H01Q 1/243 343/866
2014/0313093 A1* 10/2014 Smith ...................... H01Q 9/26 343/795

OTHER PUBLICATIONS

D. Chizhik, J. Ling, and R. A. Valenzuela, "The effect of electric field polarization on indoor propagation," in ICUPC '98. IEEE 1998 International Conference on Universal Personal Communications. Conference Proceedings (Cat. No. 98TH8384), vol. 1, pp. 459-462, Oct. 1998, doi: 10.1109/ICUPC.1998.733020.

W. Lin and R. W. Ziolkowski, "High Directivity, Compact, Omnidirectional Horizontally Polarized Antenna Array," IEEE Trans. Antennas Propag., pp. 1-1, 2020.

(Continued)

*Primary Examiner* — Daniel Munoz

(74) *Attorney, Agent, or Firm* — Renner, Kenner, Greive, Bobak, Taylor & Weber

(57) ABSTRACT

A dual-band HP omnidirectional antenna includes an electrically small (ES) first omnidirectional loop antenna for a first band, and a second omnidirectional loop antenna for a second band. The first omnidirectional loop antenna and the second omnidirectional loop antenna are capable of operating independently in the first band and the second band. A loading effect of the second omnidirectional loop antenna adapted to suppress a higher-order mode of the first omnidirectional loop antenna.

12 Claims, 20 Drawing Sheets

(56) References Cited

OTHER PUBLICATIONS

N. Nguyen-Trong, T. Kaufmann, and C. Fumeaux, "A Wideband Omnidirectional Horizontally Polarized Traveling-Wave Antenna Based on Half-Mode Substrate Integrated Waveguide," IEEE Antennas Wirel. Propag. Lett., vol. 12, pp. 682-685, 2013.
A. Alford and A. G. Kandoian, "Ultrahigh-frequency loop antennas," Electr. Eng., vol. 59, No. 12, pp. 843-848, Dec. 1940.
Y. Yu, F. Jolani, and Z. Chen, "A Wideband Omnidirectional Horizontally Polarized Antenna for 4G LTE Applications," IEEE Antennas Wirel. Propag. Lett., vol. 12, pp. 686-689, 2013.
Kunpeng Wei, Zhijun Zhang, and Zhenghe Feng, "Design of a Wideband Horizontally Polarized Omnidirectional Printed Loop Antenna," IEEE Antennas Wirel. Propag. Lett., vol. 11, pp. 49-52, 2012.
J. Shi, X. Wu, X. Qing, and Z. N. Chen, "An Omnidirectional Circularly Polarized Antenna Array," IEEE Trans. Antennas Propag., vol. 64, No. 2, pp. 574-581, Feb. 2016.
D. Kajfez, A. Z. Elsherbeni, V. Demir, and R. Hasse, "Omnidirectional Square Loop Segmented Antenna," IEEE Antennas Wirel. Propag. Lett., vol. 15, pp. 846-849, 2016.
C .-H. Ahn, S .-W. Oh, and K. Chang, "A Dual-Frequency Omnidirectional Antenna for Polarization Diversity of MIMO and Wireless Communication Applications," IEEE Antennas Wirel. Propag. Lett., vol. 8, pp. 966-969, 2009.
W. Li, K. W. Leung, and N. Yang, "Omnidirectional Dielectric Resonator Antenna With a Planar Feed for Circular Polarization Diversity Design," IEEE Trans. Antennas Propag., vol. 66, No. 3, pp. 1189-1197, Mar. 2018.
W. W. Li and K. W. Leung, "Omnidirectional Circularly Polarized Dielectric Resonator Antenna With Top-Loaded Alford Loop for Pattern Diversity Design," IEEE Trans. Antennas Propag., vol. 61, No. 8, pp. 4246-4256, Aug. 2013.
L. Zou, D. Abbott, and C. Fumeaux, "Omnidirectional Cylindrical Dielectric Resonator Antenna With Dual Polarization," IEEE Antennas Wirel. Propag. Lett., vol. 11, pp. 515-518, 2012.
K. Fan, Z.- C. Hao, Q. Yuan, J. Hu, G. Q. Luo, and W. Hong, "Wideband Horizontally Polarized Omnidirectional Antenna With a Conical Beam for Millimeter-Wave Applications," IEEE Trans. Antennas Propag., vol. 66, No. 9, pp. 4437-4448, Sep. 2018.
X. Cai and K. Sarabandi, "A Compact Broadband Horizontally Polarized Omnidirectional Antenna Using Planar Folded Dipole Elements," IEEE Trans. Antennas Propag., vol. 64, No. 2, pp. 414-422, Feb. 2016.
L. H. Ye, Y. Zhang, X. Y. Zhang, and Q. Xue, "Broadband Horizontally Polarized Omnidirectional Antenna Array for Base-Station Applications," IEEE Trans. Antennas Propag., vol. 67, No. 4, pp. 2792-2797, Apr. 2019.
Z. D. Wang, Y. Z. Yin, X. Yang, and J. J. Wu, "Design of a Wideband Horizontally Polarized Omnidirectional Antenna With Mutual Coupling Method," IEEE Trans. Antennas Propag., vol. 63, No. 7, pp. 3311-3316, Jul. 2015.
R. N. Pack, A. S. Brannon, and D. S. Filipovic, "Tightly Coupled Array of Horizontal Dipoles Over a Ground Plane," IEEE Trans. Antennas Propag., vol. 68, No. 3, pp. 2097-2107, Mar. 2020.
H.-Y. Zhang, F.-S. Zhang, F. Zhang, T. Li, and C. Li, "Bandwidth Enhancement of a Horizontally Polarized Omnidirectional Antenna by Adding Parasitic Strips," IEEE Antennas Wirel. Propag. Lett., vol. 16, pp. 880-883, 2017.
H. Liu, Y. Liu, W. Zhang, and S. Gao, "An Ultra-Wideband Horizontally Polarized Omnidirectional Circular Connected Vivaldi Antenna Array," IEEE Trans. Antennas Propag., vol. 65, No. 8, pp. 4351-4356, Aug. 2017.
A. Ye. Svezhentsev, V. Volski, S. Yan, P. J. Soh, and G. A. E. Vandenbosch, "Omnidirectional Wideband E-Shaped Cylindrical Patch Antennas," IEEE Trans. Antennas Propag., vol. 64, No. 2, pp. 796-800, Feb. 2016.
Y. Cui, P. Luo, Q. Gong, and R. Li, "A Compact Tri-Band Horizontally Polarized Omnidirectional Antenna for UAV Applications," IEEE Antennas Wirel. Propag. Lett., vol. 18, No. 4, pp. 601-605, Apr. 2019.
L. Chang, Y. Li, Z. Zhang, and Z. Feng, "Horizontally Polarized Omnidirectional Antenna Array Using Cascaded Cavities," IEEE Trans. Antennas Propag., vol. 64, No. 12, pp. 5454-5459, Dec. 2016.
X. Chen, K. Huang, and X.- B. Xu, "A Novel Planar Slot Array Antenna With Omnidirectional Pattern," IEEE Trans. Antennas Propag., vol. 59, No. 12, pp. 4853-4857, Dec. 2011.
L. Sun, Y. Li, Z. Zhang, and M. F. Iskander, "A Compact Planar Omnidirectional MIMO Array Antenna With Pattern Phase Diversity Using Folded Dipole Element," IEEE Trans. Antennas Propag., vol. 67, No. 3, pp. 1688-1696, Mar. 2019.
Q. Liu, Y. Yu, and S. He, "Capacitively Loaded, Inductively Coupled Fed Loop Antenna With an Omnidirectional Radiation Pattern for UHF RFID Tags," IEEE Antennas Wirel. Propag. Lett., vol. 12, pp. 1161-1164, 2013.
H. Bukhari and K. Sarabandi, "Miniaturized Omnidirectional Horizontally Polarized Antenna," IEEE Trans. Antennas Propag., vol. 63, No. 10, pp. 4280-4285, Oct. 2015.
P. F. Hu, Y. M. Pan, and B.-J. Hu, "Electrically Small, Planar, Complementary Antenna With Reconfigurable Frequency," IEEE Trans. Antennas Propag., vol. 67, No. 8, pp. 5176-5184, Aug. 2019.
"StarLab | MVG." https://www.mvg-world.com/zh-hans/products/antenna-measurement/multi-probe-systems/starlab.
N. Yang, K. W. Leung, and N. Wu, "Pattern-Diversity Cylindrical Dielectric Resonator Antenna Using Fundamental Modes of Different Mode Families," IEEE Trans. Antennas Propag., vol. 67, No. 11, pp. 6778-6788, Nov. 2019.
M. S. Sharawi, "Current Misuses and Future Prospects for Printed Multiple-Input, Multiple-Output Antenna Systems [Wireless Corner]," IEEE Antennas Propag. Mag., vol. 59, No. 2, pp. 162-170, Apr. 2017.
M. Ikram, M. S. Sharawi, and A. Shamim, "Compact circular connected monopole antenna arrays for wideband MIMO applications," Antennas Propag. IET Microw., vol. 12, No. 13, pp. 2122-2127, 2018.
S. Tao, H. Zhao, Y.-L. Ban, and Z. Chen, "An Overlapped Switched-Beam Antenna Array With Omnidirectional Coverage for 2.4/5.8 GHz Three-Channel MIMO WLAN Applications," IEEE Antennas Wirel. Propag. Lett., vol. 19, No. 1, pp. 79-83, Jan. 2020.

* cited by examiner

ELECTRICALLY SMALL, PLANAR, HORIZONTALLY POLARIZED DUAL-BAND OMNIDIRECTIONAL ANTENNA

FIELD OF INVENTION

This invention relates to radiofrequency (RF) devices, and in particular to miniaturized antennas.

BACKGROUND OF INVENTION

The new generation of Wi-Fi technology, Wi-Fi 6, offers a paradigm shift at the network edge: not just faster speeds as in previous generation changes, but a shift to high-efficiency Wi-Fi for substantially improved capacity, better coverage and reduced network congestion, using key technologies such OFDMA (Orthogonal Frequency Division Multiple Access) and Uplink and Downlink MU-MIMO (Multi-User Multiple-Input Multiple-Output). The MU-MIMO system supports more spatial streams by using multiple antennas packaged in a compact router device, and this imposes a stringent requirement on the antenna size. In particular, as Wi-Fi 6 and other similar wireless communication protocols support 2.4 GHz and 5 GHz dual-band simultaneous traffics, compact 2.4/5-GHz dual-band omnidirectional antennas for Wi-Fi applications are often required.

Among compact/miniaturized antennas, horizontally polarized (HP) omnidirectional antennas are known to be able to receive a higher power than vertically polarized omnidirectional antennas for indoor environments because the two polarizations have different wall transmissivities [1]. Horizontally polarized antennas have been extensively investigated in the past decade, including slot antennas [2], [3], Alford loop antennas [4], improved loop antennas [5]-[9], dielectric resonator antennas [10]-[12], and rotational antenna arrays [13]-[20]. Conventionally, there are three methods to obtain a horizontally polarized omnidirectional antenna. The first method is to obtain vertical magnetic dipoles by using vertical slot antennas fabricated on the surface of a waveguide or open cavity [2], [3],]21]-[24]. Good omnidirectional radiation patterns can be obtained in this way, but those antennas have a high profile due to the employment of vertical slots (>$0.3\lambda_0$). The second method is to use the loop antenna or its evolved structures [4]-[8]. For example, the Alford loop antenna consisting of radial and angular lines is widely used for its simple structure and relatively wide bandwidth (~20%) [4]. Its bandwidth can be increased by introducing parasitic strips/directors [5]. The third method is to adopt a rotational antenna array with a wideband power divider [13]-[20]. This kind of array can easily achieve a wide bandwidth of ~50% [14], [15]. But for the antennas as mentioned above, they usually lead to petaloid radiation patterns with large ripples in the azimuthal plane. As such, only a few of them can provide stable radiation patterns across their operating bands with frequency ratio (FR)>2 [16]-[19]. Stable radiation patterns can be obtained by using more elements in the circular array with the aid of broadband power dividers (e.g., 12 elements in [16] and 64 elements in [17]) or by enhancing the bandwidth of the elements [18]. These two approaches, of course, can be combined. However, these designs usually have a considerable size (>$0.6\lambda_0$, where $\lambda_0$ is the wavelength in air at the lowest operating frequency). Alternatively, it is possible to achieve a small horizontally polarized omnidirectional antenna with a size of only $0.13\times0.13\lambda_0^2$ [25] and [26], but such an antenna has a single narrow band of less than 1% with a low efficiency of ~66%.

REFERENCES

The following references are referred to throughout this specification, as indicated by the numbered brackets:

[1] D. Chizhik, J. Ling, and R. A. Valenzuela, "The effect of electric field polarization on indoor propagation," in ICUPC '98. IEEE 1998 International Conference on Universal Personal Communications. Conference Proceedings (Cat. No. 98TH8384), vol. 1, pp. 459-462, October 1998, doi: 10.1109/ICUPC.1998.733020.

[2] W. Lin and R. W. Ziolkowski, "High Directivity, Compact, Omnidirectional Horizontally Polarized Antenna Array," IEEE Trans. Antennas Propag., pp. 1-1, 2020.

[3] N. Nguyen-Trong, T. Kaufmann, and C. Fumeaux, "A Wideband Omnidirectional Horizontally Polarized Traveling-Wave Antenna Based on Half-Mode Substrate Integrated Waveguide," IEEE Antennas Wirel. Propag. Lett., vol. 12, pp. 682-685, 2013.

[4] A. Alford and A. G. Kandoian, "Ultrahigh-frequency loop antennas," Electr. Eng., vol. 59, no. 12, pp. 843-848, December 1940.

[5] Y. Yu, F. Jolani, and Z. Chen, "A Wideband Omnidirectional Horizontally Polarized Antenna for 4G LTE Applications," IEEE Antennas Wirel. Propag. Lett., vol. 12, pp. 686-689, 2013.

[6] Kunpeng Wei, Zhijun Zhang, and Zhenghe Feng, "Design of a Wideband Horizontally Polarized Omnidirectional Printed Loop Antenna," IEEE Antennas Wirel. Propag. Lett., vol. 11, pp. 49-52, 2012.

[7] J. Shi, X. Wu, X. Qing, and Z. N. Chen, "An Omnidirectional Circularly Polarized Antenna Array," IEEE Trans. Antennas Propag., vol. 64, no. 2, pp. 574-581, Feburary 2016.

[8] D. Kajfez, A. Z. Elsherbeni, V. Demir, and R. Hasse, "Omnidirectional Square Loop Segmented Antenna," IEEE Antennas Wirel. Propag. Lett., vol. 15, pp. 846-849, 2016.

[9] C.-H. Ahn, S.-W. Oh, and K. Chang, "A Dual-Frequency Omnidirectional Antenna for Polarization Diversity of MIMO and Wireless Communication Applications," IEEE Antennas Wirel. Propag. Lett., vol. 8, pp. 966-969, 2009.

[10] W. Li, K. W. Leung, and N. Yang, "Omnidirectional Dielectric Resonator Antenna With a Planar Feed for Circular Polarization Diversity Design," IEEE Trans. Antennas Propag., vol. 66, no. 3, pp. 1189-1197, March 2018.

[11] W. W. Li and K. W. Leung, "Omnidirectional Circularly Polarized Dielectric Resonator Antenna With Top-Loaded Alford Loop for Pattern Diversity Design," IEEE Trans. Antennas Propag., vol. 61, no. 8, pp. 4246-4256, August 2013.

[12] L. Zou, D. Abbott, and C. Fumeaux, "Omnidirectional Cylindrical Dielectric Resonator Antenna With Dual Polarization," IEEE Antennas Wirel. Propag. Lett., vol. 11, pp. 515-518, 2012.

[13] K. Fan, Z.-C. Hao, Q. Yuan, J. Hu, G. Q. Luo, and W. Hong, "Wideband Horizontally Polarized Omnidirectional Antenna With a Conical Beam for Millimeter-Wave Applications," IEEE Trans. Antennas Propag., vol. 66, no. 9, pp. 4437-4448, September 2018.

[14] X. Cai and K. Sarabandi, "A Compact Broadband Horizontally Polarized Omnidirectional Antenna Using Planar Folded Dipole Elements," IEEE Trans. Antennas Propag., vol. 64, no. 2, pp. 414-422, February 2016.

[15] L. H. Ye, Y. Zhang, X. Y. Zhang, and Q. Xue, "Broadband Horizontally Polarized Omnidirectional Antenna Array for Base-Station Applications," IEEE Trans. Antennas Propag., vol. 67, no. 4, pp. 2792-2797, April 2019.

[16] Z. D. Wang, Y. Z. Yin, X. Yang, and J. J. Wu, "Design of a Wideband Horizontally Polarized Omnidirectional Antenna With Mutual Coupling Method," IEEE Trans. Antennas Propag., vol. 63, no. 7, pp. 3311-3316, July 2015.

[17] R. N. Pack, A. S. Brannon, and D. S. Filipović, "Tightly Coupled Array of Horizontal Dipoles Over a Ground Plane," IEEE Trans. Antennas Propag., vol. 68, no. 3, pp. 2097-2107, March 2020.

[18] H.-Y. Zhang, F.-S. Zhang, F. Zhang, T. Li, and C. Li, "Bandwidth Enhancement of a Horizontally Polarized Omnidirectional Antenna by Adding Parasitic Strips," IEEE Antennas Wirel. Propag. Lett., vol. 16, pp. 880-883, 2017.

[19] H. Liu, Y. Liu, W. Zhang, and S. Gao, "An Ultra-Wideband Horizontally Polarized Omnidirectional Circular Connected Vivaldi Antenna Array," IEEE Trans. Antennas Propag., vol. 65, no. 8, pp. 4351-4356, August 2017.

[20] A. Ye. Svezhentsev, V. Volski, S. Yan, P. J. Soh, and G. A. E. Vandenbosch, "Omnidirectional Wideband E-Shaped Cylindrical Patch Antennas," IEEE Trans. Antennas Propag., vol. 64, no. 2, pp. 796-800, February 2016.

[21] Y. Cui, P. Luo, Q. Gong, and R. Li, "A Compact Tri-Band Horizontally Polarized Omnidirectional Antenna for UAV Applications," IEEE Antennas Wirel. Propag. Lett., vol. 18, no. 4, pp. 601-605, April 2019.

[22] L. Chang, Y. Li, Z. Zhang, and Z. Feng, "Horizontally Polarized Omnidirectional Antenna Array Using Cascaded Cavities," IEEE Trans. Antennas Propag., vol. 64, no. 12, pp. 5454-5459, December 2016.

[23] X. Chen, K. Huang, and X.-B. Xu, "A Novel Planar Slot Array Antenna With Omnidirectional Pattern," IEEE Trans. Antennas Propag., vol. 59, no. 12, pp. 4853-4857, December 2011.

[24] L. Sun, Y. Li, Z. Zhang, and M. F. Iskander, "A Compact Planar Omnidirectional MIMO Array Antenna With Pattern Phase Diversity Using Folded Dipole Element," IEEE Trans. Antennas Propag., vol. 67, no. 3, pp. 1688-1696, March 2019.

[25] Q. Liu, Y. Yu, and S. He, "Capacitively Loaded, Inductively Coupled Fed Loop Antenna With an Omnidirectional Radiation Pattern for UHF RFID Tags," IEEE Antennas Wirel. Propag. Lett., vol. 12, pp. 1161-1164, 2013.

[26] H. Bukhari and K. Sarabandi, "Miniaturized Omnidirectional Horizontally Polarized Antenna," IEEE Trans. Antennas Propag., vol. 63, no. 10, pp. 4280-4285, October 2015.

[27] P. F. Hu, Y. M. Pan, and B.-J. Hu, "Electrically Small, Planar, Complementary Antenna With Reconfigurable Frequency," IEEE Trans. Antennas Propag., vol. 67, no. 8, pp. 5176-5184, August 2019.

[28] "StarLab|MVG." https://www.mvg-world.com/zh-hans/products/antenna-measurement/multi-probe-systems/starlab.

[29] N. Yang, K. W. Leung, and N. Wu, "Pattern-Diversity Cylindrical Dielectric Resonator Antenna Using Fundamental Modes of Different Mode Families," IEEE Trans. Antennas Propag., vol. 67, no. 11, pp. 6778-6788, November 2019.

[30] M. S. Sharawi, "Current Misuses and Future Prospects for Printed Multiple-Input, Multiple-Output Antenna Systems [Wireless Corner]," IEEE Antennas Propag. Mag., vol. 59, no. 2, pp. 162-170, April 2017.

[31] M. Ikram, M. S. Sharawi, and A. Shamim, "Compact circular connected monopole antenna arrays for wideband MIMO applications," Antennas Propag. IET Microw., vol. 12, no. 13, pp. 2122-2127, 2018.

[32] S. Tao, H. Zhao, Y.-L. Ban, and Z. Chen, "An Overlapped Switched-Beam Antenna Array With Omnidirectional Coverage for 2.4/5.8 GHz Three-Channel MIMO WLAN Applications," IEEE Antennas Wirel. Propag. Lett., vol. 19, no. 1, pp. 79-83, January 2020.

SUMMARY OF INVENTION

Accordingly, the present invention, in one aspect, is a dual-band HP omnidirectional antenna which contains comprising an electrically small (ES) first omnidirectional loop antenna for a first band, and a second omnidirectional loop antenna for a second band. The first omnidirectional loop antenna and the second omnidirectional loop antenna are capable of operating independently in the first band and the second band. A loading effect of the second omnidirectional loop antenna adapted to suppress a higher-order mode of the first omnidirectional loop antenna.

In some embodiments, the first omnidirectional loop antenna and the second omnidirectional loop antenna are configured respectively on opposite sides of a substrate.

In some embodiments, an ES loop of the first omnidirectional loop antenna is divided into a plurality of segments each of which is excited by a corresponding radial strip. The radial strips are connected to a central patch.

In some embodiments, the plurality of segments is identical to each other. The radial strips are centrosymmetric around the central patch.

In some embodiments, the plurality of segments is divided by four interlaced coupling slots that provide capacitive loadings.

In some embodiments, the second omnidirectional loop antenna contains an Alford loop excited by a plurality of radial arms. The plurality of radial arms is connected to a feeding probe at the center of Alford loop.

In some embodiments, each of the plurality of radial arms includes a meander structure.

In some embodiments, the second omnidirectional loop antenna further includes an angular parasitic strip placed next to each angular strip of the Alford loop.

According to another aspect of the invention, there is provided a dual-band HP omnidirectional antenna which includes a first omnidirectional loop antenna for a first band; a second omnidirectional loop antenna for a second band; and a substrate. The first omnidirectional loop antenna and the second omnidirectional loop antenna are capable of operating independently in the first band and the second band. The first omnidirectional loop antenna and the second omnidirectional loop antenna are configured respectively on opposite sides of the substrate.

According to a further aspect of the invention, there is provided an antenna array includes a plurality of dual-band HP omnidirectional antennas. Each antenna contains an electrically small (ES) first omnidirectional loop antenna for a first band, and a second omnidirectional loop antenna for a second band. The first omnidirectional loop antenna and the second omnidirectional loop antenna are capable of operating independently in the first band and the second band. A loading effect of the second omnidirectional loop antenna adapted to suppress a higher-order mode of the first omnidirectional loop antenna.

In some embodiments, in the antenna array there are four dual-band HP omnidirectional antennas. Centers of each of the dual-band HP omnidirectional antennas form a square shape.

One can see that embodiments of the invention therefore combine an electrically small lower-band omnidirectional loop antenna with an upper-band Alford loop antenna on a single substrate. Not only the frequency ratio of the antenna can be made higher than 2, but also it effectively increases the bandwidth of the Alford loop. Compared with other conventional HP omnidirectional antenna, antennas according to embodiments of the invention can be made into a much smaller size and more uniform omnidirectional radiation patterns. In one example, a compact, miniaturized ($0.296\lambda_0$), planar, HP omnidirectional antenna with FR>2 can be obtained, with small gain variation (<1 dB) of azimuthal plane maintained in the two bands.

As a particular suitable application, the antennas according to embodiments of the invention can be used in dual-band wireless communication systems to provide large signal coverage and stable wireless access for mobile terminals. Since such antennas have a planar structure, small size, and a small gain variation of azimuthal plane, they are very useful for compact systems such as Wi-Fi routers and sensors.

In some embodiments, a 2×2 MIMO antenna is built using multiple dual-band HP omnidirectional antennas in a square configuration. Such a design has the smallest size compared to conventional MIMO antennas, and its gain variation (<3 dB) in the azimuthal plane is also smallest. This implies that radiation patterns in such a 2×2 MIMO antenna are most uniform and stable. Moreover, no power dividers are needed. In summary, the dual-band antenna design according to embodiments of the invention could achieve the largest number of antenna elements and also the highest efficiency, with its size comparable to or even smaller than those of conventional designs.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which.

In the drawings, like numerals indicate like parts throughout the several embodiments described herein.

DETAILED DESCRIPTION

Figure 1:
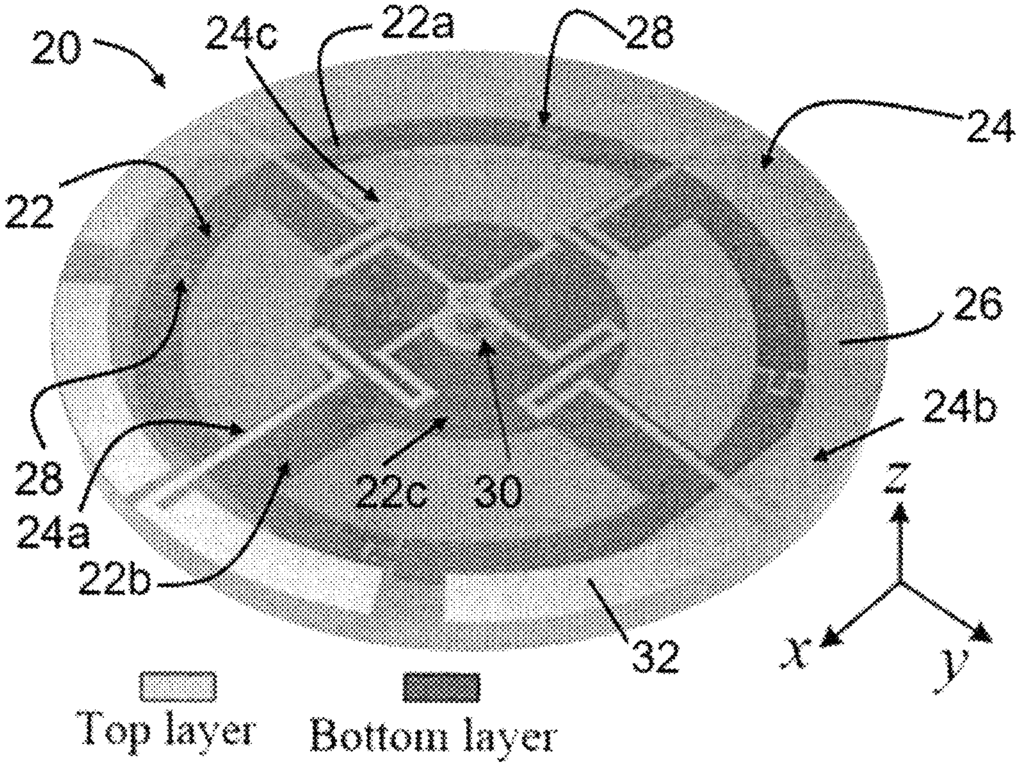
FIG. 1 is a perspective view of an electrically small, planar, horizontally polarized, dual-band omnidirectional antenna showing both a top layer and a bottom layer of the antenna, according to a first embodiment of the invention.
Figure 2A:
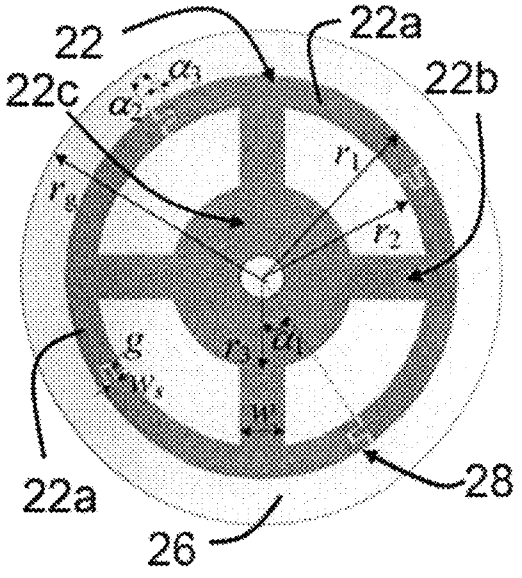
FIG. 2*a* is a planar view of the bottom layer of the antenna in FIG. 1.
Figure 2B:
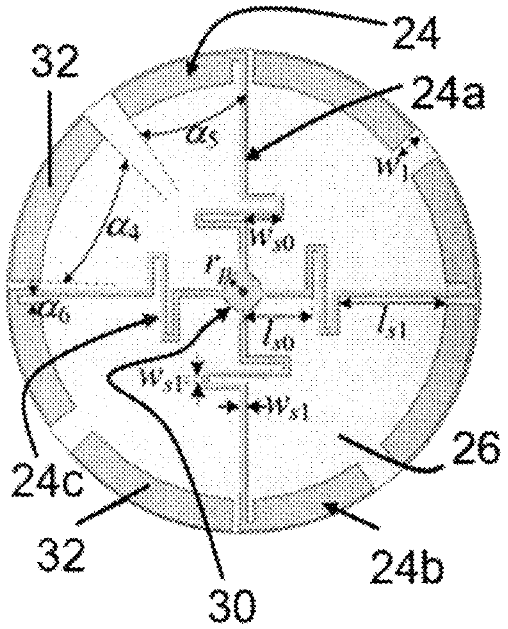
FIG. 2*b* is a planar view of the top layer of the antenna in FIG. 1.

Referring now to FIGS. 1-2*b*, the first embodiment of the present invention is an electrically small, planar, horizontally polarized, dual-band omnidirectional antenna 20 that is in the form of a miniaturized, microstrip antenna. The antenna 20 consists of an electrically small (ES) loop 22 and an Alford loop 24 both of which are segmented, printed on the bottom and top faces of a substrate 26 respectively. The substrate 26 has a permittivity of $\varepsilon_r$, a thickness of $h_s$, and a radius of $r_g$. The ES loop 22 is equally divided into four segments 22*a* by four interlaced coupling slots 28 that provide capacitive loadings. Each interlaced coupling slot 28 has a substantially Π shape. The currents on the ES loop 22 that are segmented can remain uniform because of the capacitive loadings and thus give an omnidirectional radiation pattern. With reference to FIG. 2*a*, the ES loop 22 is excited by four radial strips 22*b* that are connected to a central circular patch 22*c*. The four segments 22*a* are centrosymmetric around the central circular patch 22*c*. The radial strips 22*b* are separated from each other angularly by 90° and the symmetric configuration of the radial strips 22*b* helps reduce the gain variation of the ES loop 22 in the azimuthal plane. The central circular patch 22*c* are concentric with the circle formed by the four segments 22*a*.

FIG. 2*b* best shows the Alford loop 24 printed on the top surface of the substrate 26. The Alford loop 24 is excited by four radial arms 24*a*, which are connected to the feeding probe 30 at the center of the Alford loop 24. Each radial arm 24*a* is introduced a meander structure 24*c* that is folded to obtain another loop mode for broadening the bandwidth. The four radial arms 24*a* are separated from each other angularly by 90°, and the four meander structures 24*c* together form a square shape. An angular parasitic strip 32 is placed next to each angular strip 24*b* of the Alford loop 24 to reduce the gain variation in the azimuthal plane. Each parasitic strip 32 has a subtended angle of α4.

One can see that in the antenna 20 an electrically small lower-band radiator (i.e., the ES loop 22) is directly combined with an upper-band radiator (i.e. the Alford loop 24). By suppressing the higher-order mode of the lower-band radiator the omnidirectional radiation pattern of the upper-band radiator can be maintained and primarily controlled by upper-band radiator. On the other hand, since the fundamental mode of upper-band radiator is not close to the lower band, its effects on the fundamental mode of the lower-band radiator is small. As a result, the two radiators are practically independent of each other although they are very close to each other.

Figure 3:
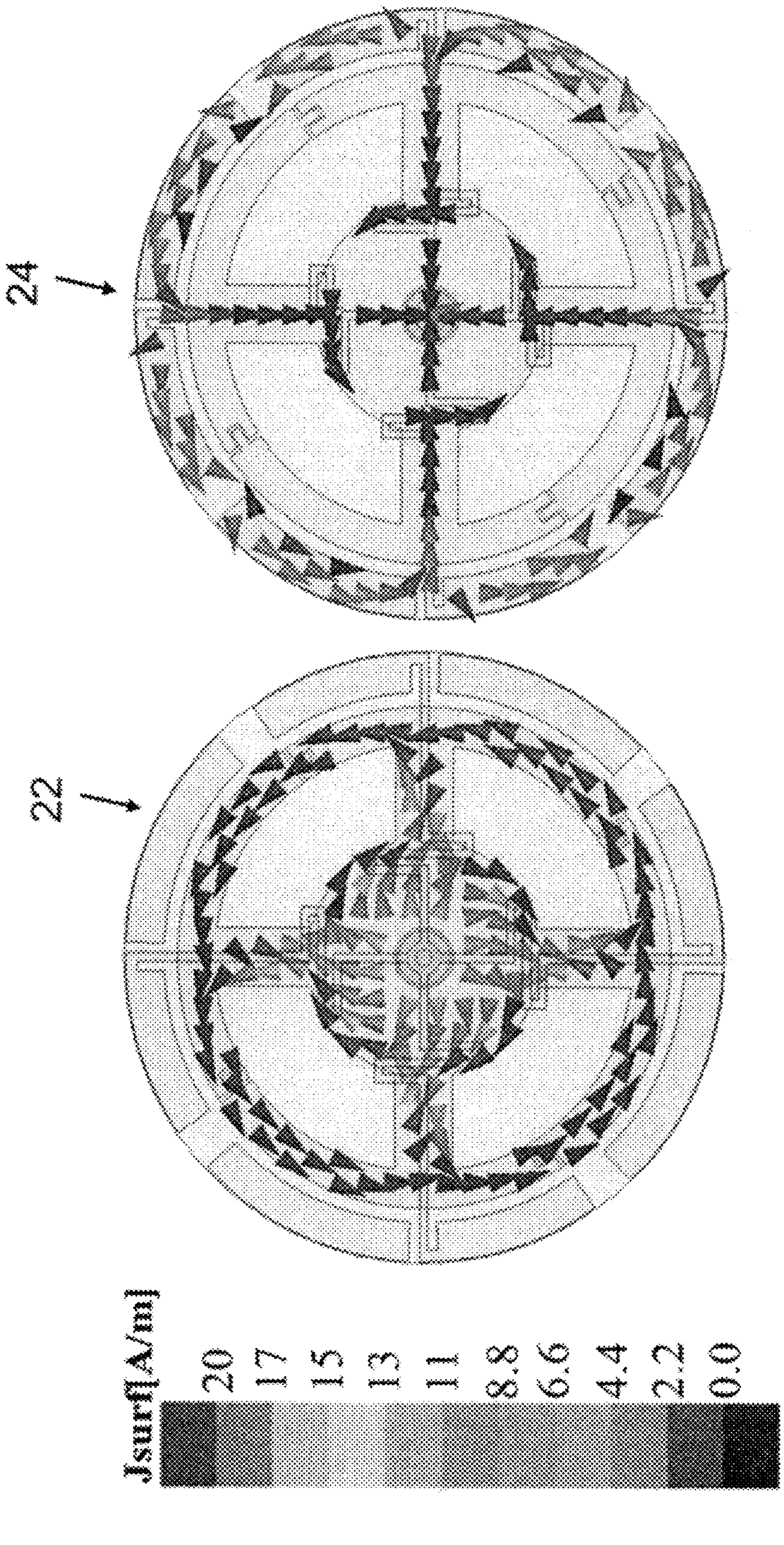
FIG. 3 illustrates simulated current distributions of the antenna in FIG. 1 at 2.44 GHz.
Figure 4:
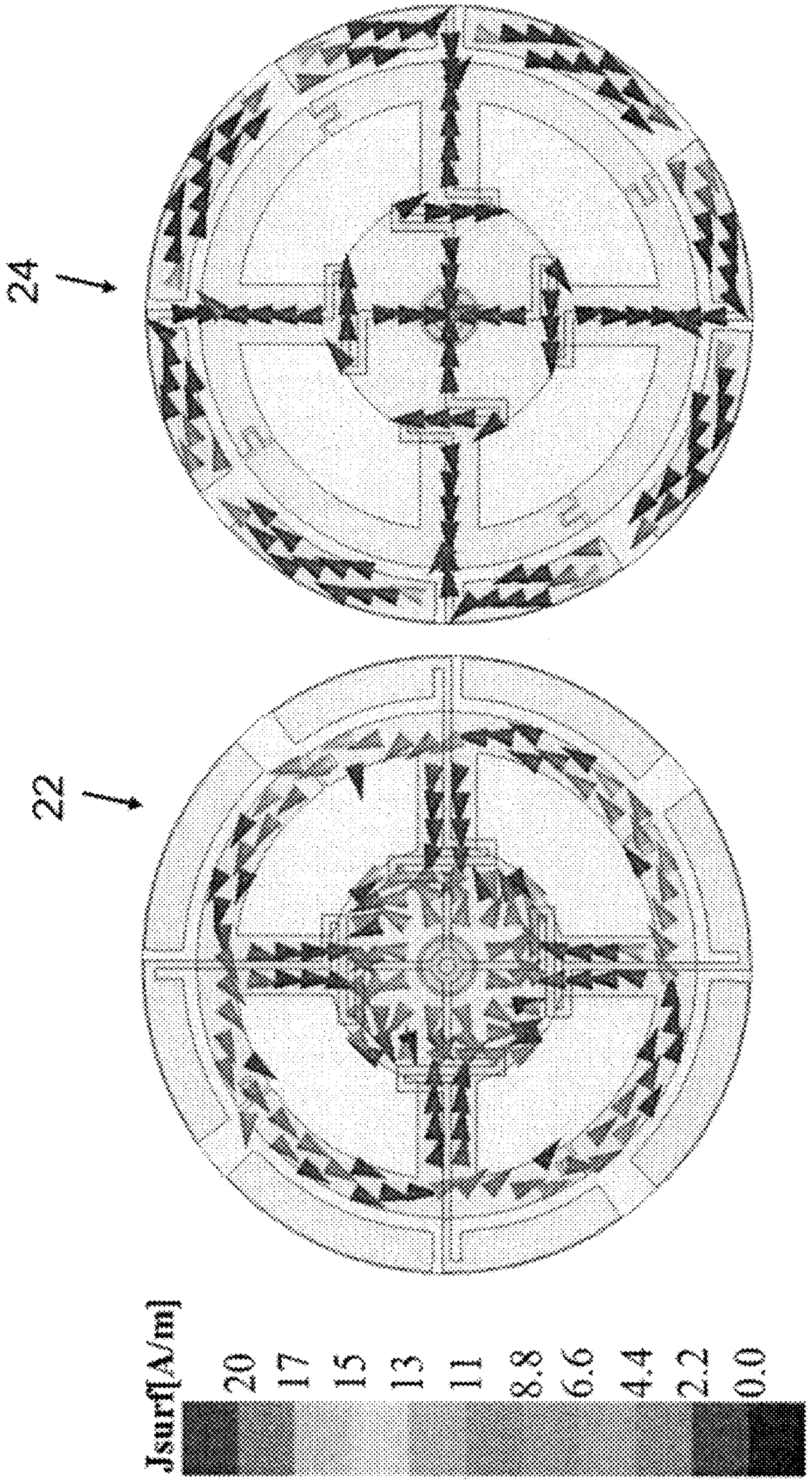
FIG. 4 illustrates simulated current distributions of the antenna in FIG. 1 at 5.5 GHz.

Now turning to simulation results of the antenna 20 described above. FIG. 3 shows the current distributions on the antenna 20 at the center frequency of the 2.4 GHz band which is 2.44 GHz. The currents mainly concentrate on the ES loop 22, and the currents are in phase and uniform. Similar current distributions are observed on the Alford loop 24, but the current is much weaker, showing that their effects on the ES loop 22 are small. With reference to FIG. 4, the currents on the Alford loop 24 become much stronger at the center frequency of the 5 GHz band which is 5.5 GHz, because it is around the resonance of the Alford loop 24. Considerable currents are also observed on the ES loop 22 but since these currents are almost uniform and in phase, they basically do not contribute to the gain variation in the azimuthal plane. The simulation results show that the ES loop 22 and Alford loop 24 can be operated independently, which greatly facilitates the dual-band design of the antenna 20.

Figure 5:
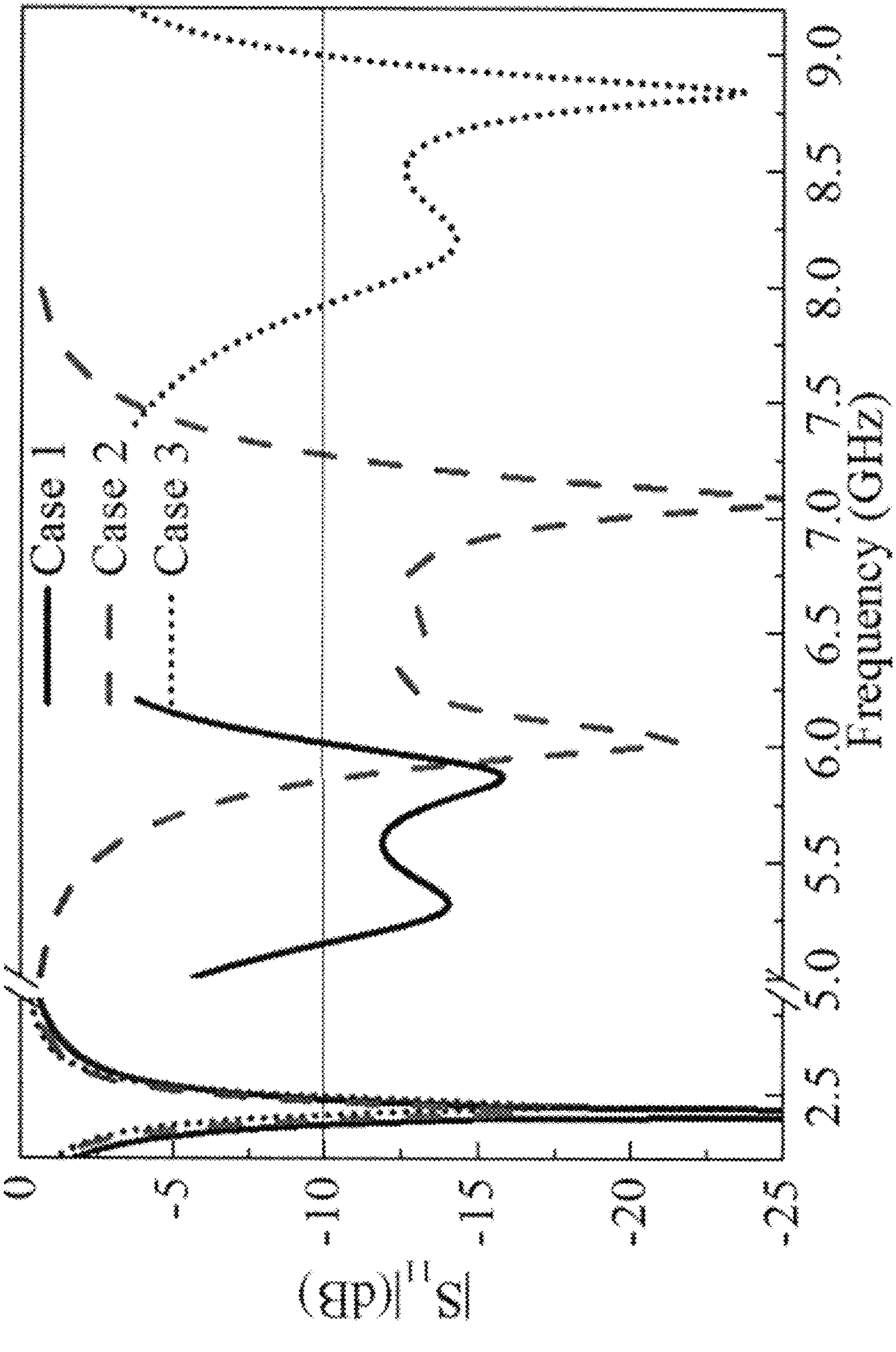
FIG. 5 illustrates simulated reflection coefficients of the antenna in FIG. 1 with three different frequency ratios.

Based on the preceding analysis, a flexible frequency ratio can be obtained for the antenna 20. A small frequency ratio (FR<2) can be easily achieved by increasing the size of the Alford loop 24 or decreasing the size of the ES loop 22. Therefore, the focus here is on the larger FR case. FIG. 5 shows the result of increasing the frequency ratio of the antenna 20 in three different exemplary cases. In Case 1 $\alpha_4$=43.4°, $w_{s0}$=3 mm, $l_{s1}$=8.5 mm, $w_1$=2.35 mm (see the annotations in FIGS. 2*a*-2*b*). In Case 2 $\alpha_4$=36°, $w_{s0}$=2 mm, $l_{s1}$=7.4 mm, $w_1$=2.35 mm. In Case 3 $\alpha_4$=30°, $w_{s0}$=2.7 mm, $l_{s1}$=7 mm, $w_1$=2 mm. It can be observed from FIG. 5 that when the upper band is adjusted to higher frequencies by tuning the parameters of the Alford loop 24, the 2.4-GHz band is virtually not affected, as desired. The largest frequency ratio in FIG. 5 is 3.75, with the gain variation kept below 2 dB in the azimuthal plane.

Figure 6:
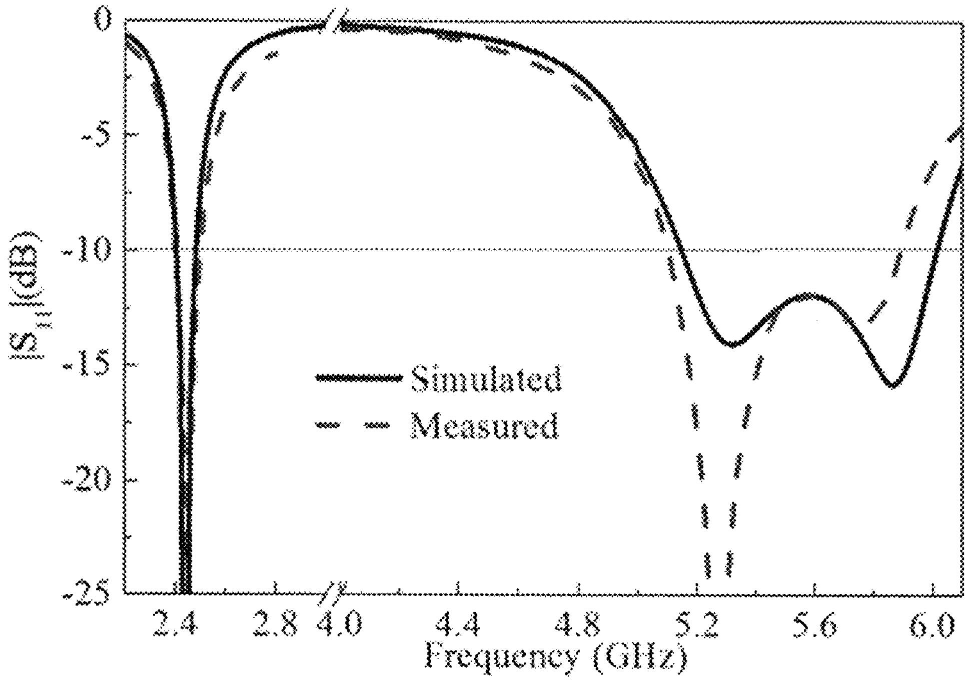
FIG. 6 shows simulated and measured results of the antenna in FIG. 1 and its prototype on reflection coefficients.

A prototype (not shown) of the antenna 20 in FIGS. 1-2*b* was fabricated and measured to verify the simulation. The prototype was fabricated on a small substrate with a dielectric constant of $\varepsilon_r$=4.4, loss tangent of 0.0025, and thickness of $h_s$=1.6 mm. For the prototype, the reflection coefficient was measured using an Agilent 4-port network analyzer E5071C, whereas the radiation pattern and antenna gain were measured using a Satimo Starlab system. An RF choke was added to the outer conductor of the feeding coaxial cable to suppress stray radiation from the cable. FIG. 6 shows the simulated and measured reflection coefficients. With reference to FIG. 6, reasonable agreement between the simulated and measured results is obtained. The measured −10-dB impedance bandwidths of the lower- and upper bands are 4.08% (2.4-2.5 GHz) and 14.37% (5.1-5.9 GHz), respectively, entirely covering the 2.4- and 5-GHz Wi-Fi bands. The resonant mode at 2.4 GHz is caused by the ES loop 22, whereas the two resonant modes at 5.2 GHz and 5.8 GHz are due to the modified Alford loop 24. It should be mentioned that no other resonant modes are found between the two bands ($|S_{11}|$>−0.3 dB from 3 GHz to 4 GHz). This is highly desirable because it can effectively reduce the interference with 5G devices operating in 3.5-GHz band.

Figure 7:
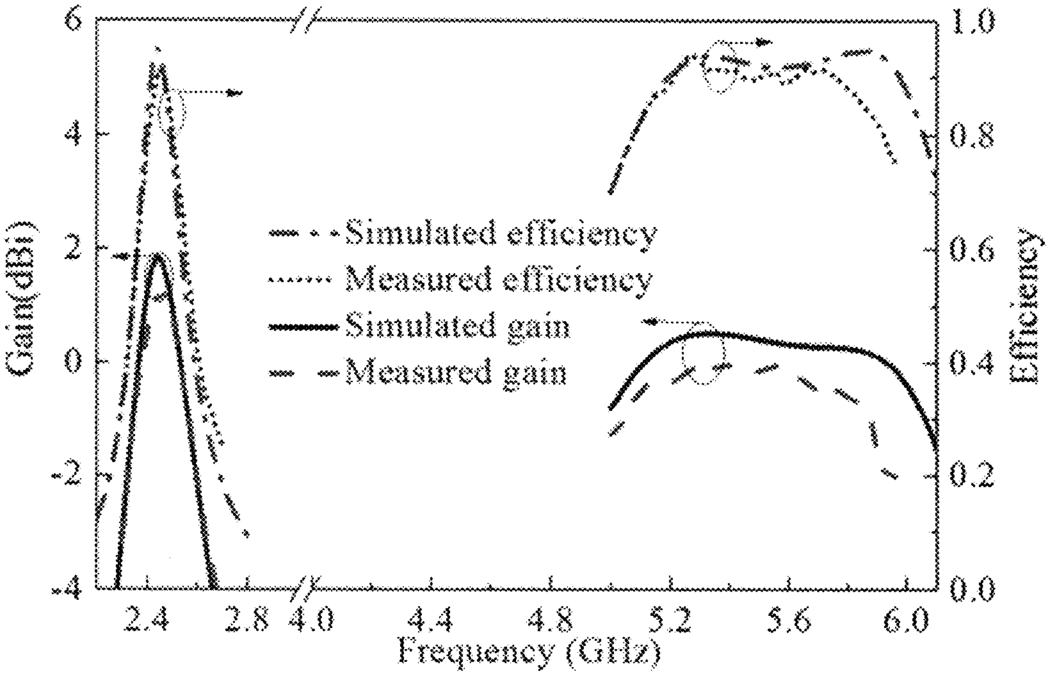
FIG. 7 shows simulated and measured results of the antenna in FIG. 1 and its prototype on antenna gains and total antenna efficiencies.

FIG. 7 shows the simulated and measured antenna gains at ϕ=90°, θ=90°. The measured gain is 0.5-1.28 dBi in the 2.4-GHz band. It is lower in the 5-GHz band, being −0.6-0 dBi. It is because the beamwidth in the elevation plane becomes wider in the 5-GHz band. Also shown in FIG. 7 are the simulated and measured total efficiencies that have taken impedance mismatch into account. The measured efficiency was obtained by using the Satimo SatEnv software. High measured total efficiencies of ~90% are obtained within the two operating bands. This is because the loop current of the antenna 20 is mainly in phase. In contrast, some conventional designs have considerable out-of-phase currents that can dissipate power and thus, reduce the efficiency.

Figure 8A:
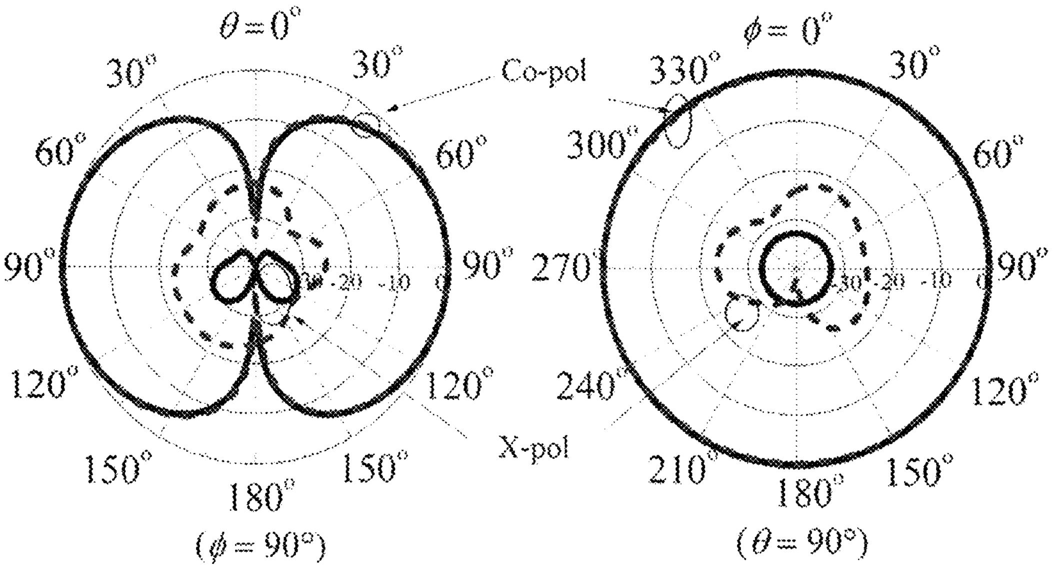
FIG. 8*a* shows simulated and measured radiation patterns of the antenna in FIG. 1 and its prototype at 2.44 GHz.
Figure 8B:
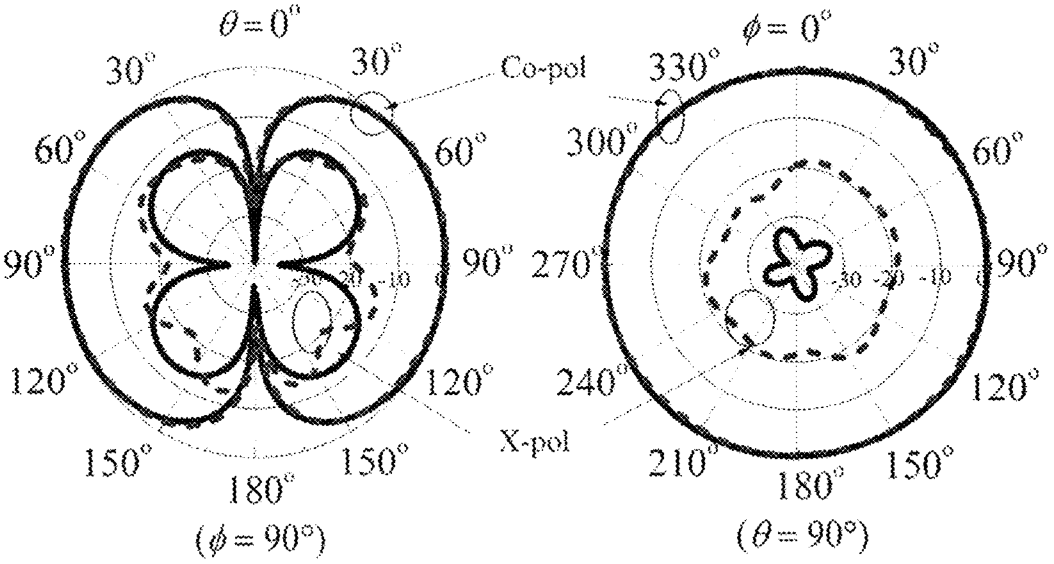
FIG. 8*b* shows simulated and measured radiation patterns of the antenna in FIG. 1 and its prototype at 5.5 GHz.
Figure 8C:
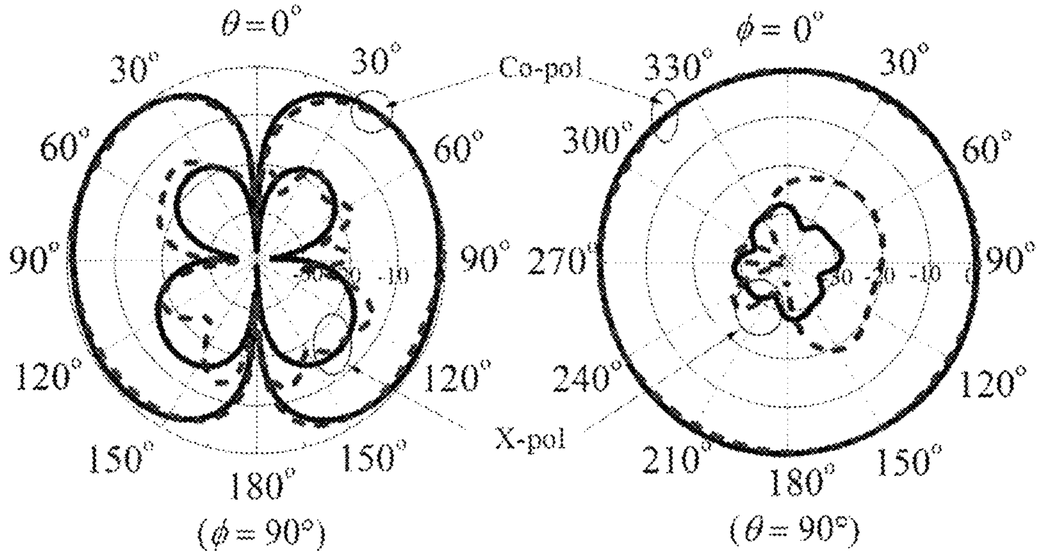
FIG. 8*c* shows simulated and measured radiation patterns of the antenna in FIG. 1 and its prototype at 5.8 GHz.

FIGS. 8*a*-8*c* show the simulated and measured normalized radiation patterns of the antenna 20 at 2.44, 5.2, and 5.8 GHz respectively. Both the simulated and measured results show a null at θ=0° (z-direction), which is desirable for azimuthal omnidirectional radiation patterns. The 3-dB beamwidths in the elevation plane (ϕ=90° are 98°, 128° and 129° at 2.44 GHz, 5.2 GHz and 5.8 GHz, respectively. In the azimuthal plane, the co-polarized fields are generally stronger than the cross-polarized counterparts by 22, 18, and 19 dB at 2.44, 5.2, and 5.8 GHz, respectively. It was found that the radiation patterns are very stable at other passband frequencies, but the results are not included here for brevity.

Figure 9:
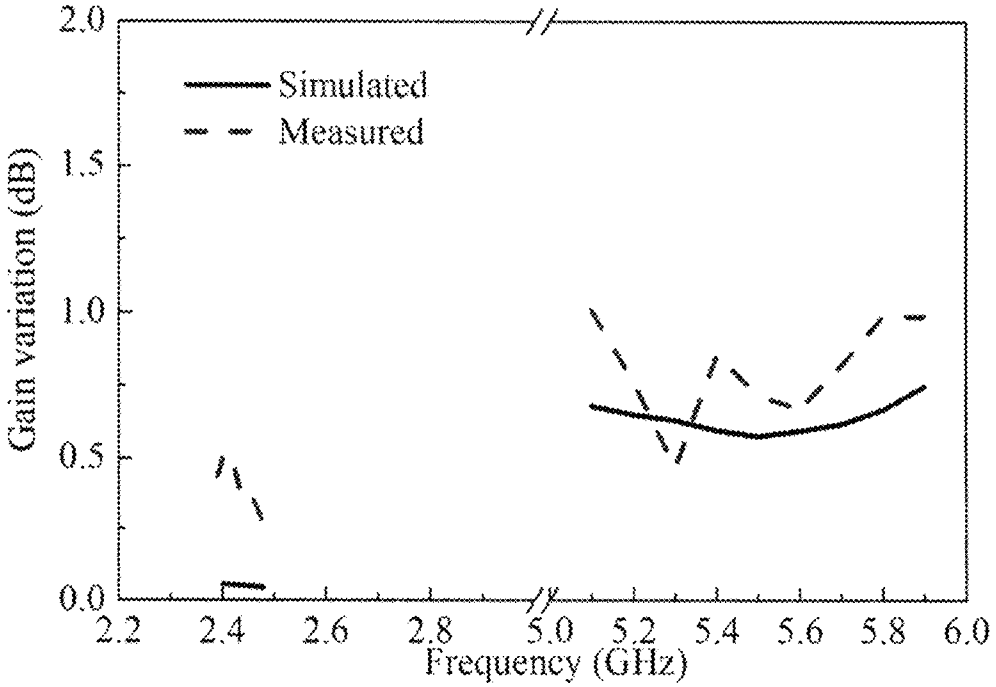
FIG. 9 shows simulated and measured gain variation of the antenna in FIG. 1 and its prototype in the azimuthal plane.

FIG. 9 shows the simulated and measured gain variation of the antenna 20 in the azimuthal plane across the two passbands. As can be observed from FIG. 9, the gain variations are not large. In the 2.4-GHz band, the simulated and measured peak variations are 0.058 dB and 0.5 dB, respectively. In the 5-GHz band, the simulated and measured peak variations increase to 0.7 dB and 1 dB, respectively. These results verify that the radiation fields of the antenna 20 are uniform.

TABLE 1

COMPARISON OF EMBODIMENT-1 WITH PRIOR ART HORIZONTALLY POLARIZED OMNIDIRECTIONAL ANTENNAS

| Ref. | Frequency band | Frequency ratio ($f_h/f_l$) | Size | Gain variation (azimuthal plane) | Planar | Efficiency | Power divider |
|---|---|---|---|---|---|---|---|
| [5] | S (1.76-2.68 GHz) | 1.52 | $0.59 \times 0.59\lambda_0^2$ | 4 | Y | 83% | N |
| [6] | S (2.17-2.97 GHz) | 1.36 | $0.38 \times 0.38\lambda_0^2$ | — | Y | ~90% | N |
| [9] | D (2.45, 3.9 GHz) | 1.59 | $0.40 \times 0.40\lambda_0^2$ | — | Y | — | N |
| [14] | S (1.19-2.00 GHz) | 1.68 | $0.34 \times 0.34\lambda_0^2$ | 2.8 | N | — | 4-way PD |
| [15] | S (1.67-2.73 GHz) | 1.63 | $0.67 \times 0.67\lambda_0^2$ | 2.5 | Y | — | 3-way PD |
| [16] | S (1.70-3.54 GHz) | 2.08 | $0.85 \times 0.85\lambda_0^2$ | 1.5 | Y | ~80% | 12-way PD |
| [17] | S (0.78-2.69 GHz) | 3.44 | $1.15 \times 1.15\lambda_0^2$ | 1.9 | N | 55%-85% | 4 16-way PDs |
| [18] | S (1.58-3.88 GHz) | 2.45 | $0.63 \times 0.63\lambda_0^2$ | 2.2 | Y | — | 4-way PD |
| Embodiment-1 | D (2.4-2.5 GHz), (5.1-5.9 GHz) | 2.46 | $0.296 \times 0.296\lambda_0^2$ | 1 | Y | 90% | N |

S: Single band, D: Dual band, $f_h$: Highest operating frequency, $f_l$: Lowest operating frequency, $\lambda_0$: Wavelength in air at lowest operating frequency, PD: Power divider.

Table 1 above compares the antenna 20 (Embodiment-1) with a number of prior art horizontally polarized omnidirectional antennas. With reference to Table 1, only few reported designs have a frequency ratio of FR>2. Although relatively large frequency ratios of 2.08, 3.44, and 2.45 have been obtained [16]-[18], the corresponding antenna sizes are as large as $0.85\times0.85\lambda_0^2$, $1.15\times1.15\lambda_0^2$, and $0.63\times0.63\lambda_0^2$. In contrast, antenna 20 has a large FR of 2.46 and also an electrically small size of $0.296\times0.296\lambda_0^2$. Further, it has a high total antenna efficiency of ~90%. It is worth mentioning that the frequency ratio can be easily extended to 3.75 by using the method provided herein. While Embodiment-1 has the smallest size in the table, its gain variation (<1 dB) in the azimuthal plane is also smallest among the different designs. It implies that the radiation patterns of Embodiment-1 are most uniform and stable. Moreover, no power dividers are needed in Embodiment-1.

Figure 10A:
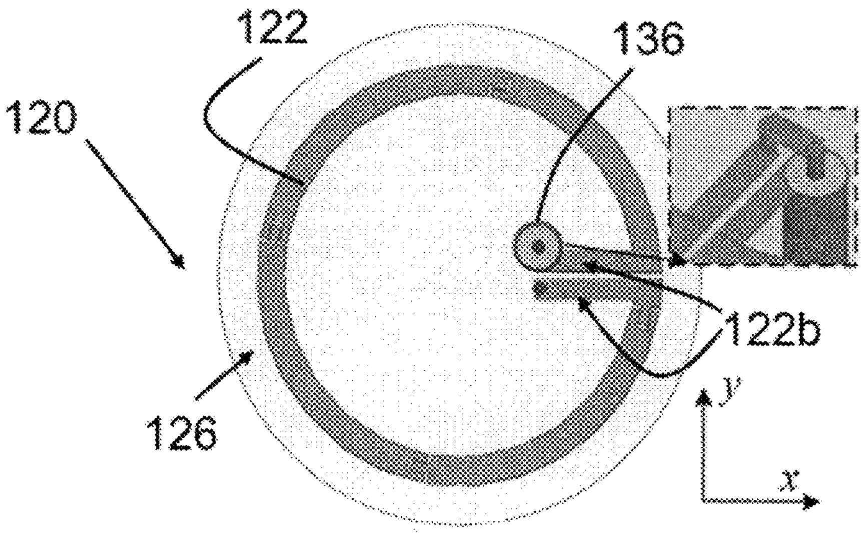
FIG. 10*a* is a planar view of the bottom layer of a prior art antenna.
Figure 10B:
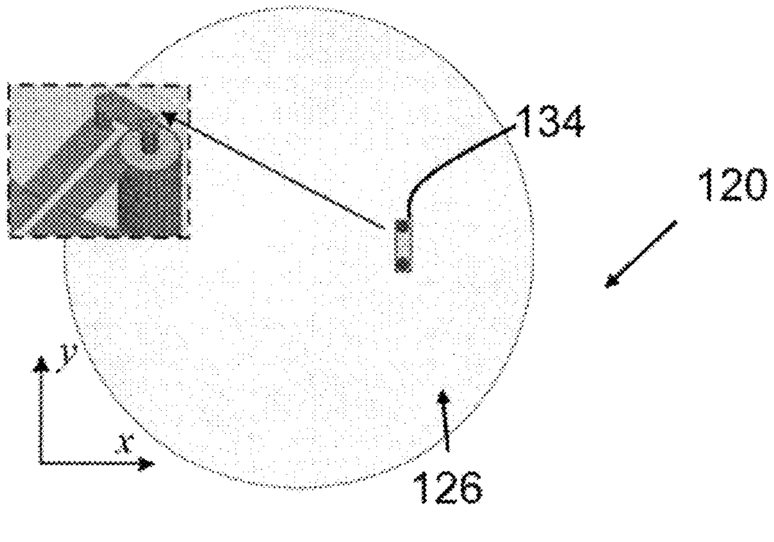
FIG. 10*b* is a planar view of the top layer of the prior art antenna in FIG. 10*a*.
Figure 11:
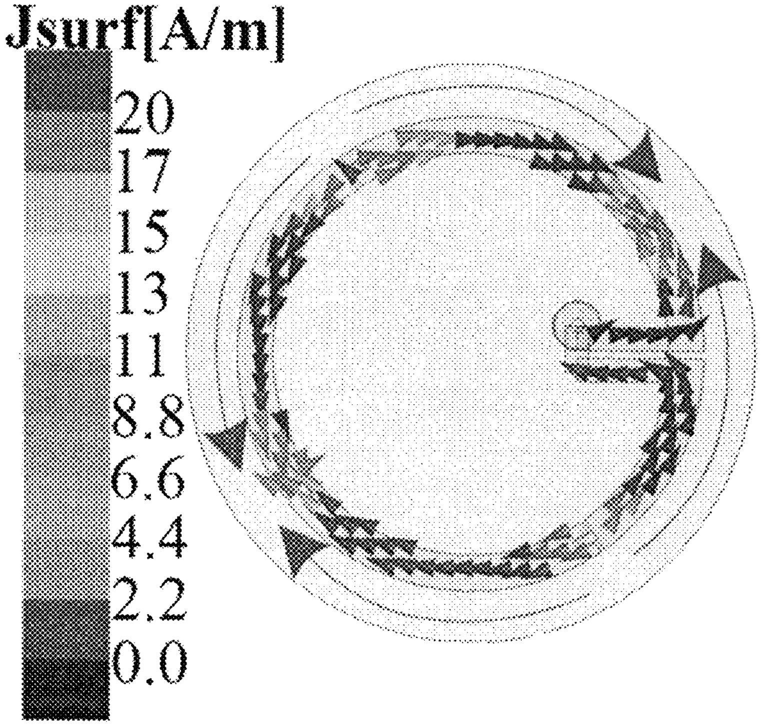
FIG. 11 shows simulated results of the antenna in FIGS. 10*a*-10*b* on current distribution.
Figure 12:
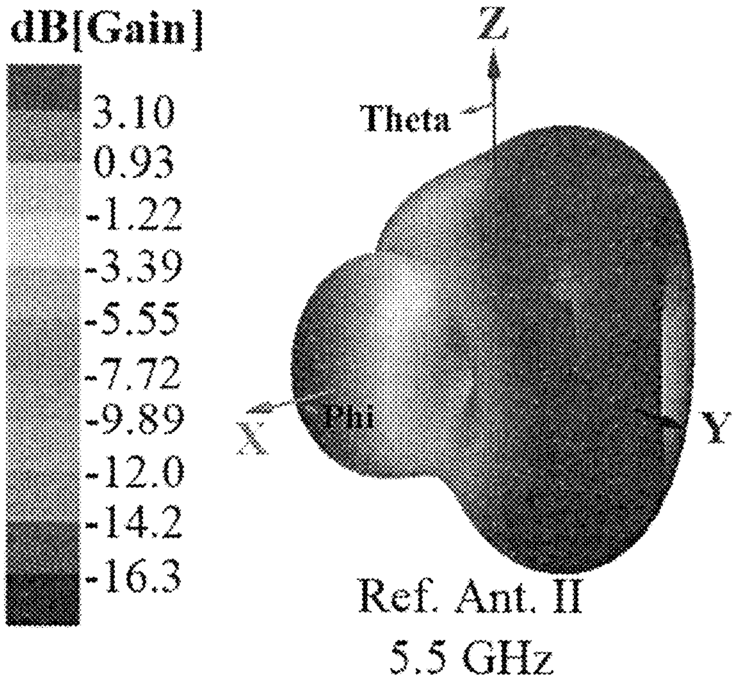
FIG. 12 shows simulated results of the antenna in FIGS. 10*a*-10*b* on 3D radiation patterns.

Turning to FIGS. 10*a* and 10*b*, which show a prior art antenna 120 for the purpose of performance comparison with specific embodiments of the invention that are described herein. The reference antenna 120 is a single ES segmented loop antenna containing an ES loop 122 that is fed via two parallel printed lines 122*b*, which are connected to an inner conductor 134 and an outer conductor 136 of a coaxial cable. The ES loop 122 is formed on the bottom layer (see FIG. 10*a*) of a substrate 126, but there is no antenna loop on the top layer (see FIG. 10*b*) of the substrate 126. This prior art antenna 120 is a single-band loop antenna, and its fundamental mode at 2.4 GHz has a good omnidirectional radiation pattern. However, its omnidirectional radiation pattern will deteriorate as the frequency significantly increases to 5.5 GHz. Its reflection coefficient, current distribution, and radiation patterns at 5.5 GHz are respectively shown in FIG. 19, FIG. 11 and FIG. 12. It can be observed from these figures that for the prior art antenna 120*a* higher-order mode appears in 5-GHz band, causing the radiation pattern to deteriorate.

Figure 13A:
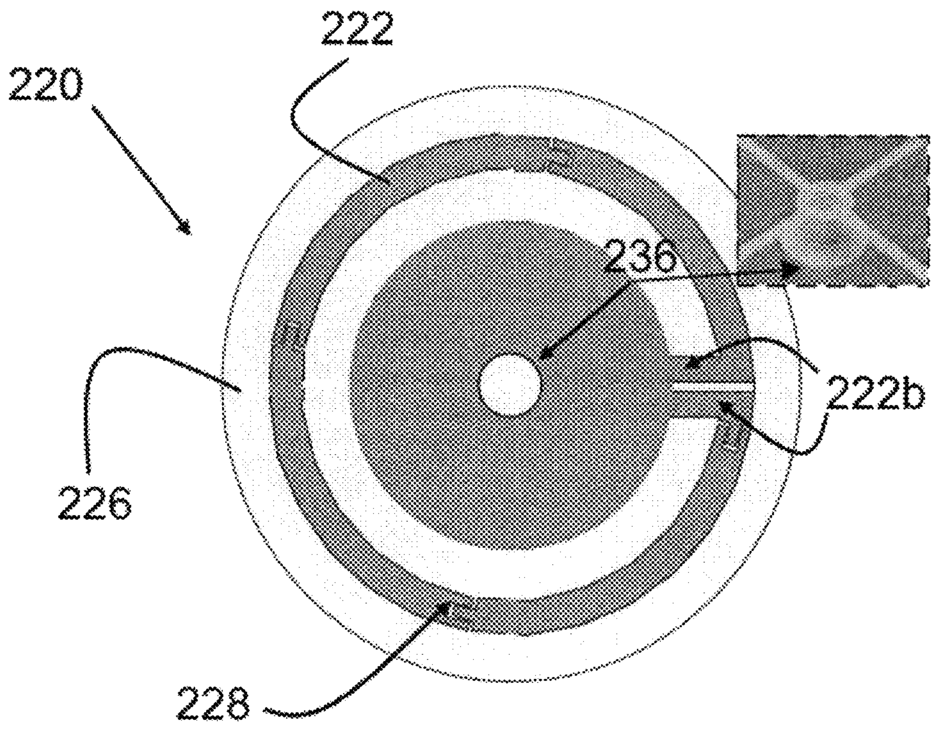
FIG. 13*a* is a planar view of the bottom layer of an antenna according to another embodiment of the invention.
Figure 13B:
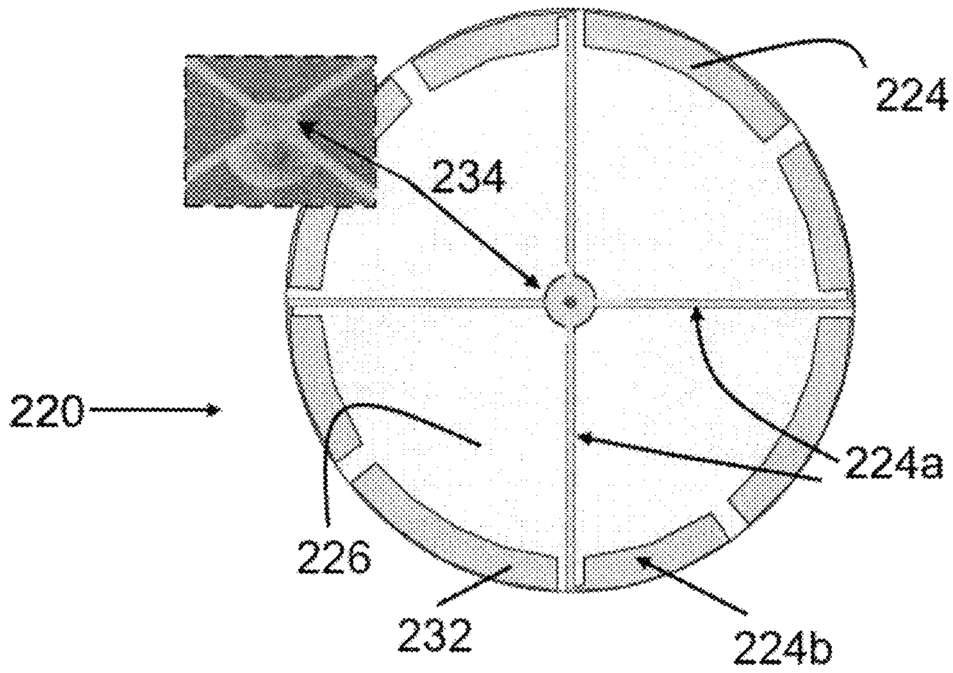
FIG. 13*b* is a planar view of the top layer of an antenna in FIG. 13*a*.
Figure 18:
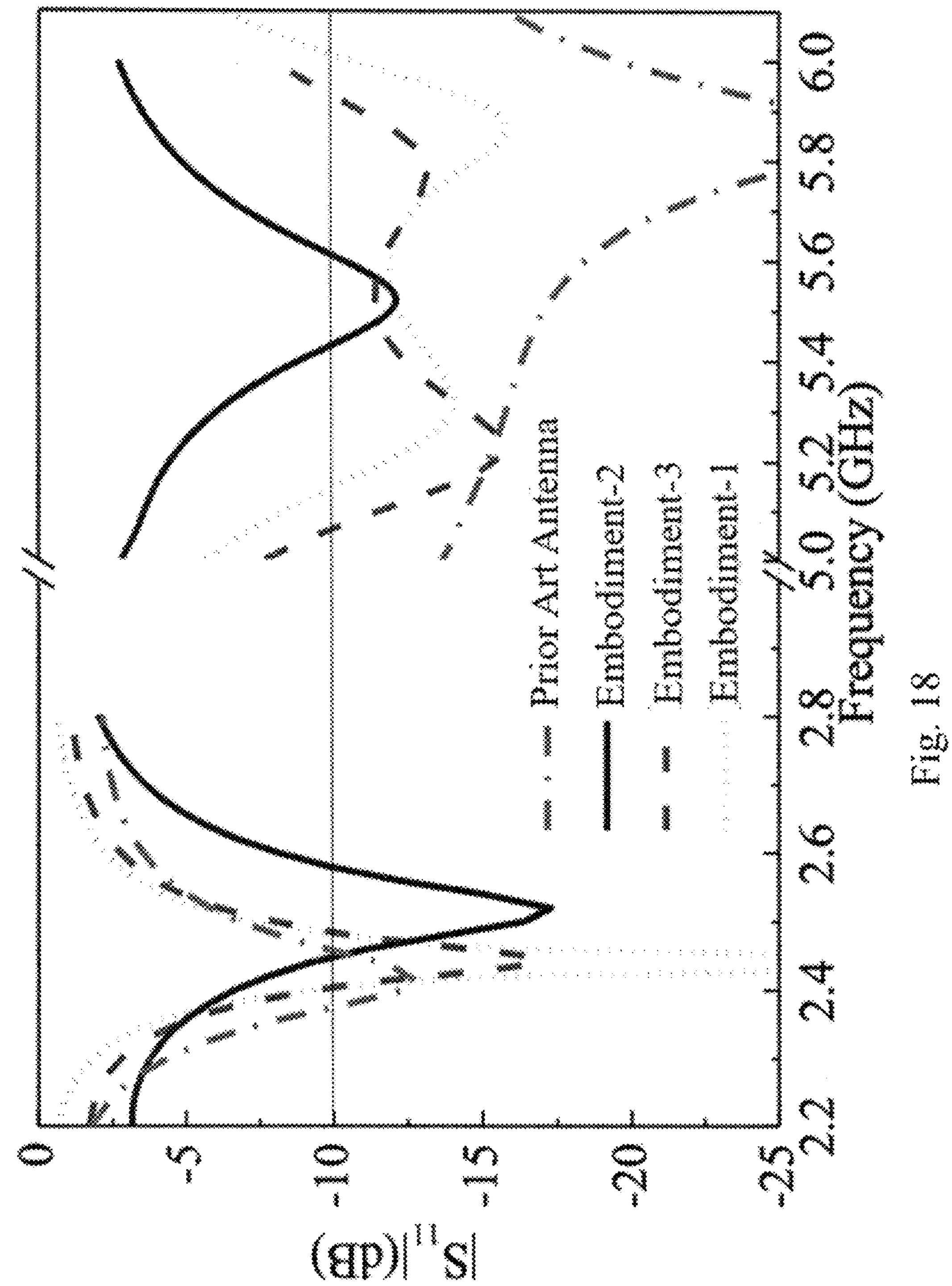
FIG. 18 shows the simulated results of reflection coefficients of the prior art antenna as well as various antennas according to embodiments of the invention as illustrated above.

FIGS. 13*a* and 13*b* show a dual-band antenna 220 according to another embodiment of the invention. Compared to the antenna shown in FIGS. 1-2*b* (hereinafter Embodiment-1), the antenna 220 in FIGS. 13*a*-13*b* (hereinafter Embodiment-2) similarly contains two antenna loops on opposite sides of a substate 226. The two antenna loops contain an ES loop 222 on a bottom side of the substrate 226, and an Alford loop 224 on the top side of substrate 226. Like the case in FIG. 10*a*, the ES loop 222 is fed via two parallel printed lines 222*b*. Nonetheless, the ES loop 222 contains interlaced coupling slot 228 similar to those in FIGS. 1-2*a*. It can be seen from FIG. 13*a* that only the outer conductor 236 of the coaxial cable is used to excite the ES loop 222, whereas the inner conductor 234 is reserved for exciting the Alford loop 224. Since the single-sided Alford loop 224 does not have complement arms on the other side of the substrate 226 to form a complete loop, four parasitic strips 224*a* are introduced to the blank space to reduce the gain variation in the azimuthal plane. The Alford loop 224 also contains angular parasitic strip 232 placed next to each angular strip 224*b* of the Alford loop 224. The fundamental mode of the Alford loop 224 at 5.5 GHz is shown in FIG. 18. This mode is sensitive to the dimensions of the Alford loop 224 only.

Figure 14A:
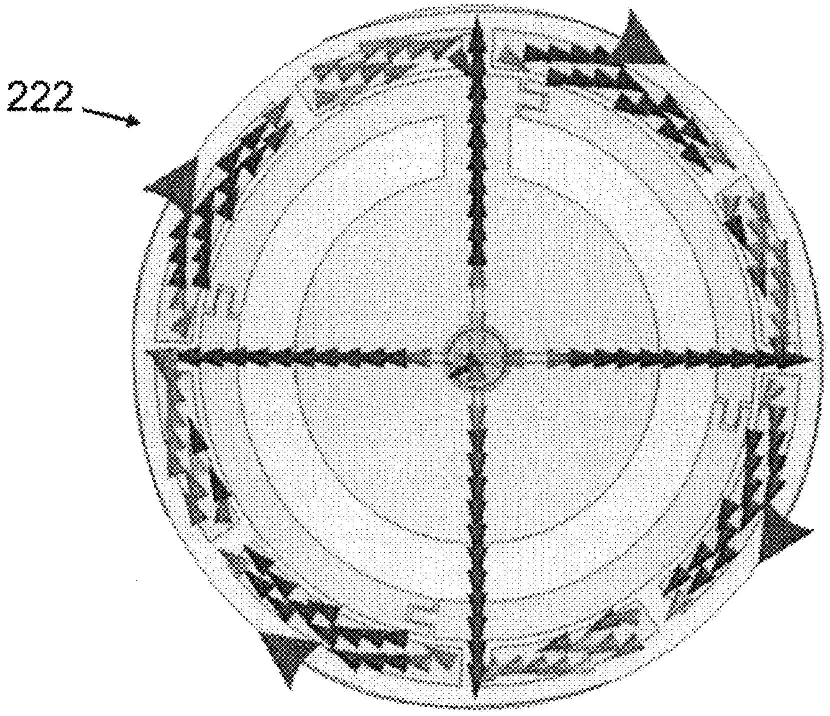
FIG. 14*a* shows the simulated current distribution of the Alford loop of the antenna in FIGS. 13*a*-13*b*.
Figure 14B:
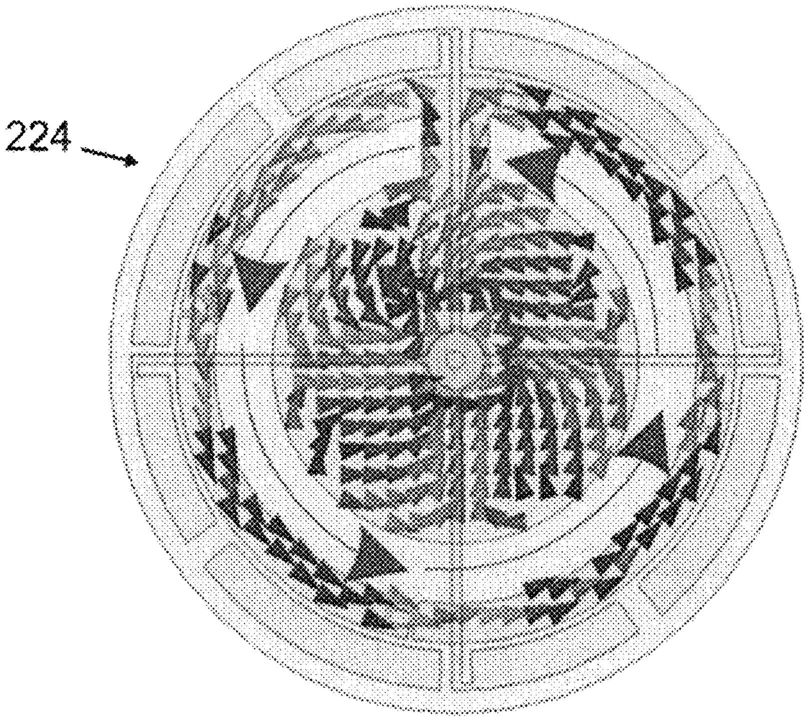
FIG. 14*b* shows the simulated current distribution of the ES loop of the antenna in FIGS. 13*a*-13*b*.
Figure 15:
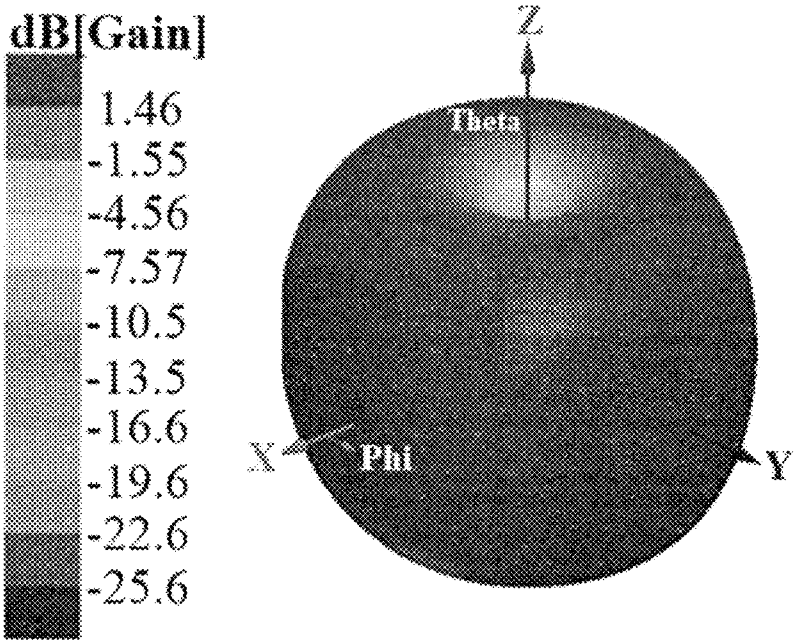
FIG. 15 shows the simulated 3D radiation pattern of the antenna in FIGS. 13*a*-13*b*.

In 5-GHz band, the loading effect of the Alford loop 224 significantly changes the current distribution of the ES loop 222. As shown in FIGS. 14*a*-14*b*, the current flows in different directions along the ES loop 222 at 5.5 GHz when there is no Alford loop 224. After the Alford loop 224 is added, the current of the ES loop 222 now flows along one angular direction only. This current distribution is similar to that of the ES loop 222 excited in the fundamental mode (2.4 GHz). FIG. 15 shows the radiation pattern of the antenna 220 at 5.5 GHz. As a comparison between the prior art antenna in FIG. 12 and the antenna 220 in FIG. 15, the higher-order mode of the prior art antenna has an irregular radiation pattern, but the antenna 220 has an azimuthally omnidirectional radiation pattern at the same frequency, as expected. Since the higher-order mode of the ES loop 222 is effectively suppressed, it will not affect the omnidirectional radiation pattern in the upper band. It should be mentioned that in FIG. 18, the radiation mode of antenna 220 at 5.5 GHz was found to be dominant by the Alford loop mode. Therefore, the lower- and upper-band are practically controlled by the ES loop 222 and Alford loop 224, respectively.

Figure 16A:
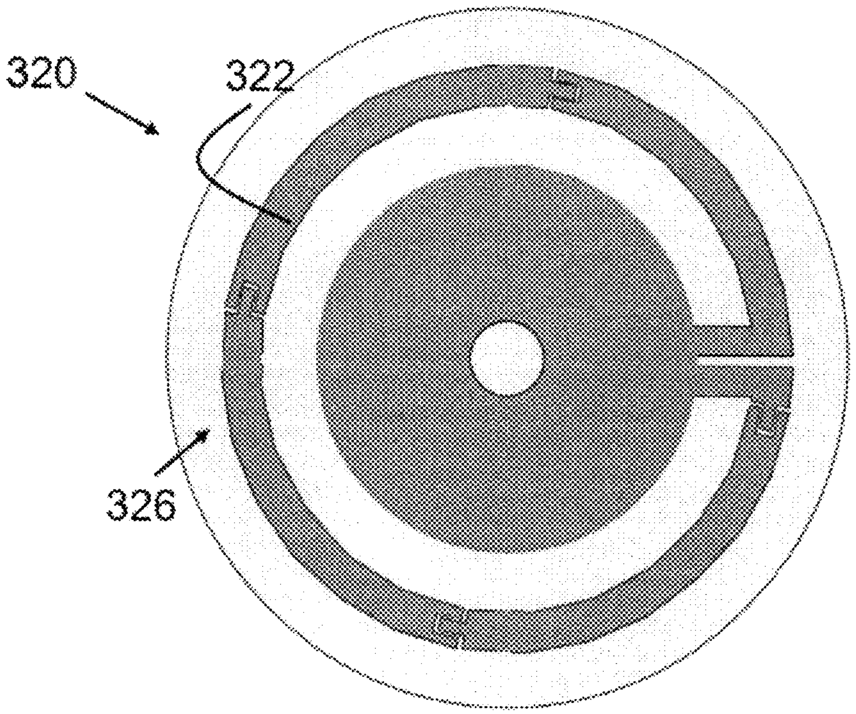
FIG. 16*a* is a planar view of the bottom layer of an antenna according to another embodiment of the invention.
Figure 16B:
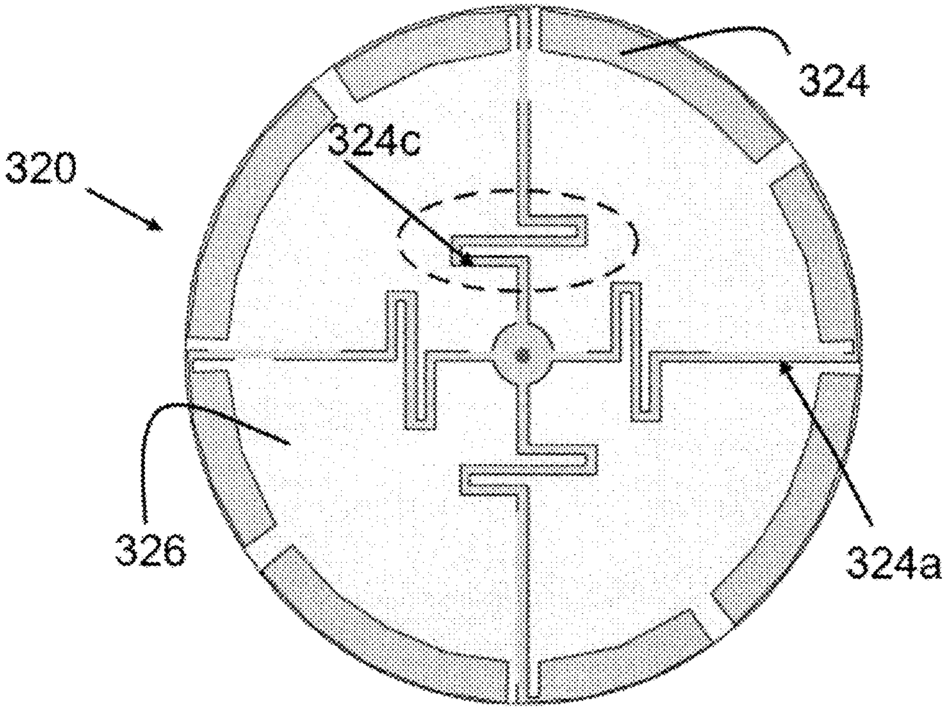
FIG. 16*b* is a planar view of the top layer of an antenna in FIG. 16*a*.
Figure 17:
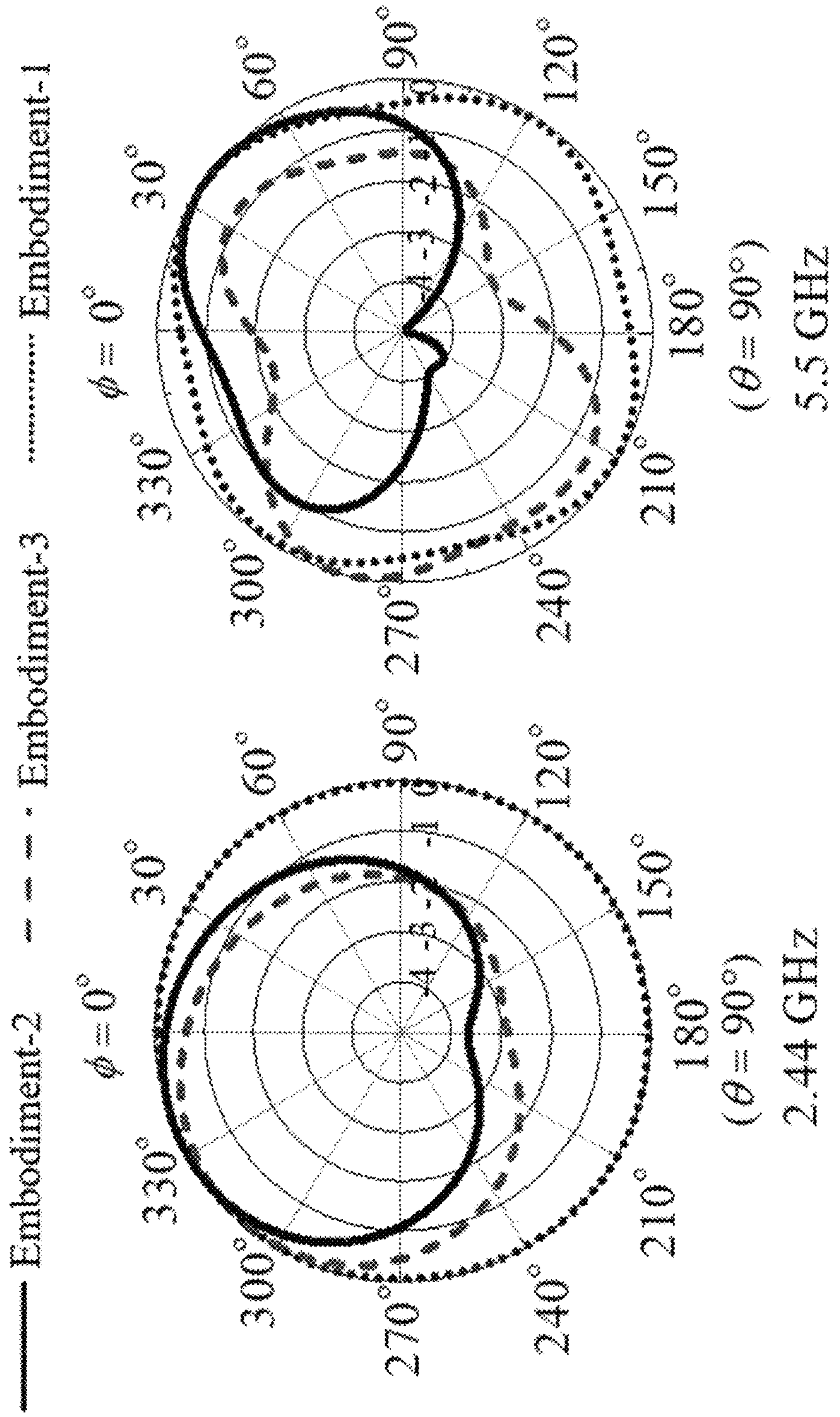
FIG. 17 shows the simulated normalized radiation patterns of various antennas according to embodiments of the invention described above at 2.44 GHz and 5.5 GHz.

FIGS. 16*a* and 16*b* show a dual-band antenna 320 according to another embodiment of the invention (hereinafter Embodiment-3). For the sake of brevity, similar structures and features of the antenna 320 as compared to those of the antenna in FIGS. 13*a*-13*b* will not be described herein again, but only their differences will be described. The ES loop 322 on the bottom side of the substrate 326 has a similar structure as the ES loop in the antenna in FIGS. 13*a*-13*b*. On the other hand, the parasitic strips 324*a* which are radial feeding lines of the Alford loop 324 are each folded to form a meander structures 324*c* in a way similar to those in FIGS. 1 and 2*b*. By the meander structures 324*c*, as compared to the antenna in FIGS. 13*a*-13*b* (i.e., Embodiment-2), the original 5.5-GHz resonant mode is shifted downwards to 5.2 GHz in Embodiment-3. Also, a new resonant mode is excited at 5.8 GHz, which is a higher-order mode of the Alford loop 324. The impedance bandwidth is now improved from 3% to 15.8% (5.06-5.93 GHz) in Embodiment-3. By optimizing the length of the folded part, the anti-phase currents can concentrate on the radial feedlines only. Thus, the currents on the Alford loop 324 (angular arms) can be in phase, radiating omnidirectional fields. The normalized radiation patterns are shown in FIG. 17. It can be seen from the figure that the gain variation in the azimuthal plane (0=)90° is reduced from 3.6 dB (Embodiment-2) to 2.9 dB (Embodiment-3) at 2.44 GHz, while it is improved from 6 dB to 3 dB at 5.5 GHz.

By comparing Embodiment-1, Embodiment-2 and Embodiment-3 as described above, it can be observed that the feeding of the 5-GHz Alford loop in Embodiment-3 is symmetrical, which should not give such a large gain variation in the azimuthal plane. However, the feeding of the 2.4-GHz ES loop in Embodiment-3 is asymmetrical, which may lead to non-uniform current distributions on the ES loop and thus the large gain variation. To further improve the gain variation in the azimuthal plane, the feeding of the ES loop in Embodiment-3 can be modified to have four symmetrical radial strips like those in Embodiment-1. FIG. 18 shows the comparison results between the prior art antenna in FIGS. 10*a*-10*a*-10*b*, and Embodiments 1-3 as described above. As can be seen from FIG. 18, the resonance frequency of Embodiment-1 can be maintained at 2.4-GHz and 5-GHz Wi-Fi bands by slightly tuning its dimensions. In addition, it can be observed from FIG. 17 that the gain variation of the azimuthal plane in Embodiment-1 is significantly reduced, being only 0.05 dB and 0.57 dB at 2.44 and 5.5 GHz, respectively. The uniform radiation field in the azimuthal plane is very desirable for the wireless access of mobile ends.

Figure 19:
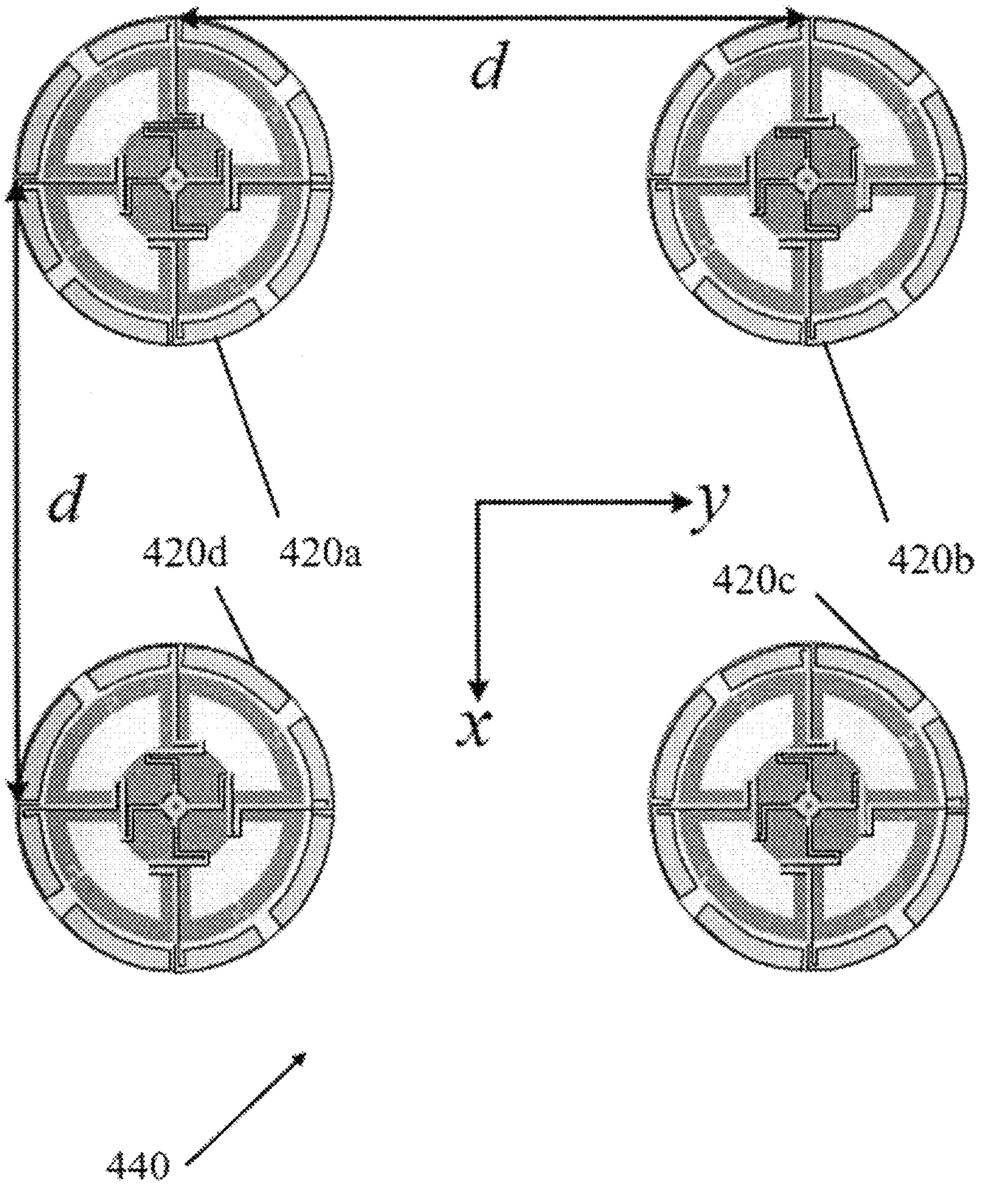
FIG. 19 shows the configuration of a dual-band omnidirectional MIMO antenna according to another embodiment of the invention.
Figure 20:
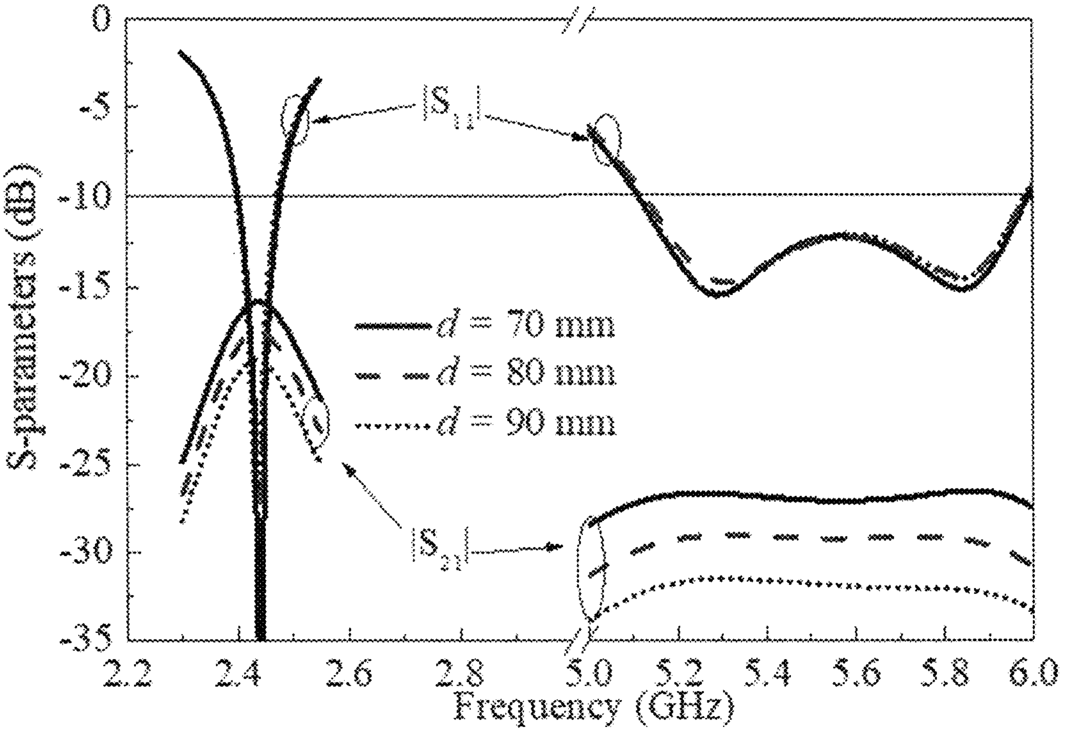
FIG. 20 shows simulated S-parameters of the dual-band omnidirectional MIMO antenna in FIG. 19.
Figure 21:
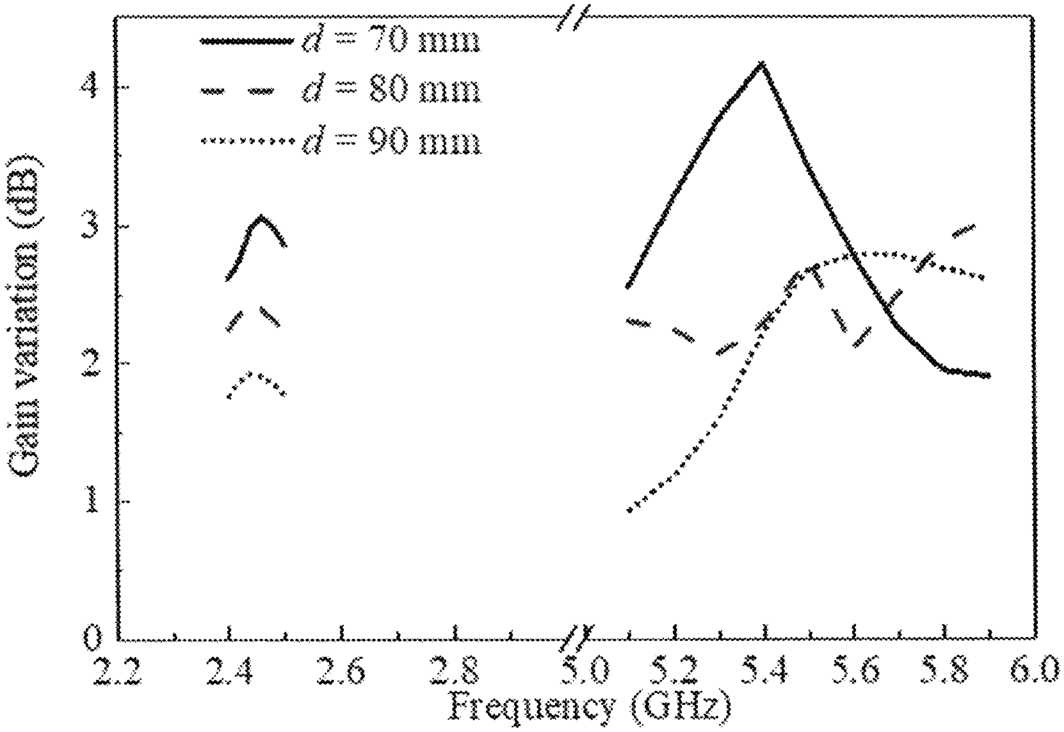
FIG. 21 shows the simulated gain variation of the dual-band omnidirectional MIMO antenna in FIG. 19, in azimuthal (xoy) plane.

Turning now to FIG. 19 which shows the configuration of a 2×2 MIMO antenna 440 for Wi-Fi applications which incorporates four identical electrically small, planar, horizontally polarized, dual-band omnidirectional antenna 420*a*-420*d* each being similar to that shown in FIGS. 1-2*b*. Each of the four dual-band antennas 420*a*-420*d* is called an element of the 2×2 MIMO antenna 440. In The distance between two adjacent elements is d. To begin, the effects of d on the coupling between the antenna elements are investigated. FIG. 20 shows the simulated S-parameters of the MIMO antenna 440. With reference to FIG. 20, when d is larger than 70 mm, the isolations between the elements is generally higher than 15 dB and 26 dB for 2.4- and 5-GHz bands, respectively. FIG. 21 shows the effects of d on the gain variation in the azimuthal plane. As can be observed from FIG. 21, as d increases from 70 to 90 mm, the gain variation in the azimuthal plane decreases from 3 dB to 1.9 dB and from 4 dB to 2.7 dB for 2.4-GHz and 5-GHz bands, respectively. One can see that better MIMO performance can be obtained by using a larger d, at the cost of increasing the antenna size. Therefore, a compromise between the MIMO performance and antenna size is needed. In one implementation, a compromised value of d=80 mm ($0.64\lambda_0$ at 2.4 GHz) was chosen. At this value of d, the isolation between the elements is higher than 17.5 dB and 29 dB for the 2.4- and 5-GHz bands, respectively, whereas the respective gain variations are smaller than 2.42 dB and 2.9 dB in the azimuthal plane. The overall size of the MIMO antenna is 117×117 $mm^2$, which is $0.93\times0.93\lambda_0^2$ at 2.4 GHz.

Figure 22A:
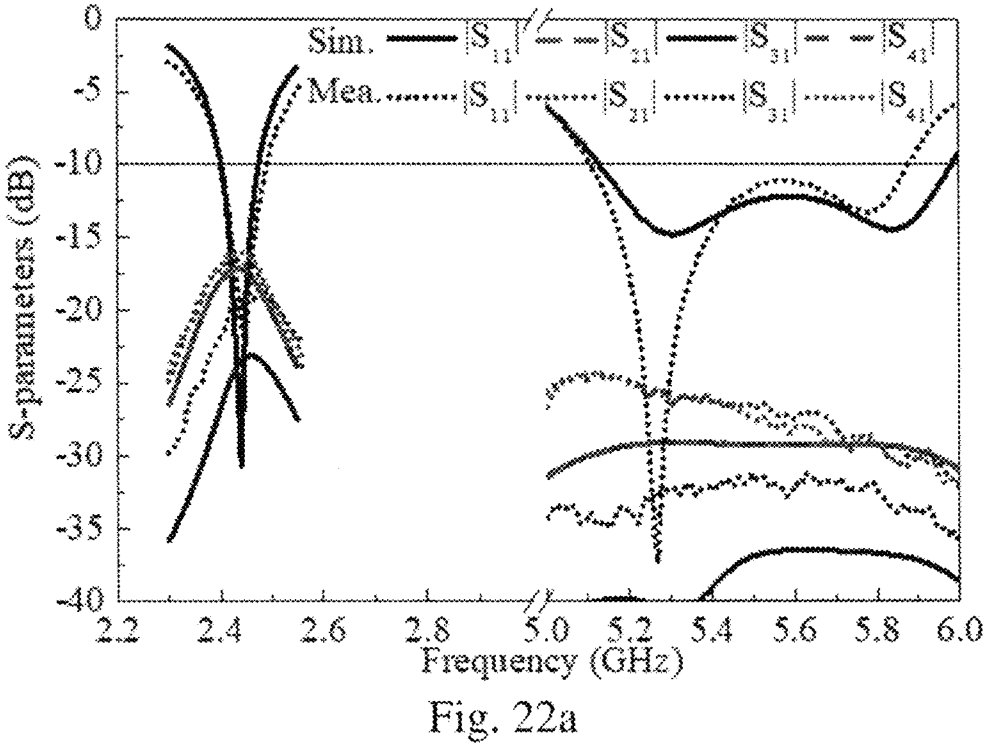
FIG. 22*a* shows simulated and measured results of the dual-band omnidirectional MIMO antenna in FIG. 19 and its prototype on S-parameters.
Figure 22B:
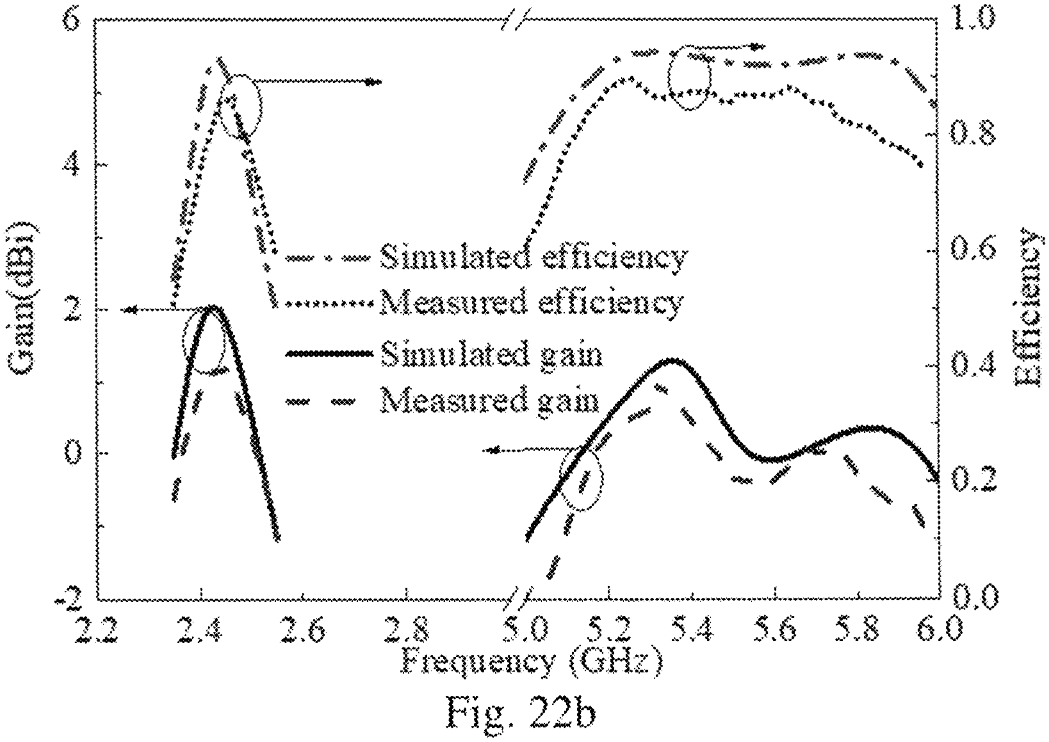
FIG. 22*b* shows simulated and measured results of the dual-band omnidirectional MIMO antenna in FIG. 19 and its prototype on antenna gains and efficiency.

To verify the above design, a prototype (not shown) of the dual-band omnidirectional MIMO antenna 440 was fabricated and measured. In the measurement, the elements of the MIMO antenna were supported by a 3D-printed holder (not shown), which is not needed in actual applications. In the S-parameter measurements, the 4 ports of the MIMO antenna 440 were simultaneously connected to those of a 4-port network analyzer. Since the Satimo Starlab system has only one port for the antenna under test, other ports of the prototype of the MIMO antenna 440 were terminated with matched loads. FIGS. 22*a*-22*b* show the simulated and measured S-parameters, antenna gains, and total efficiencies of the prototype of the MIMO antenna 440. As can be observed from FIG. 22(*a*), reasonable agreement between the simulated and measured results is observed. For the omnidirectional antenna 420*a* in FIG. 19, the measured −10-dB impedance bandwidths of the two bands are 3.9% (2.4-2.495 GHz) and 14.2% (5.1-5.88 GHz). It should be mentioned that the results are close to those of FIGS. 6-7 for the single antenna element, meaning that the coupling effect is not very strong. This can also be seen from the high isolation between the four elements; the measured mutual couplings are lower than −16 dB and −24.5 dB for the lower- and upper-bands, respectively. Similar results were obtained for omnidirectional antennas 420*b*, 420*c* and 420*d* due to the symmetric structure and the results are therefore not included here for brevity. With reference to FIG. 22*b*, the measured gain at $\phi$=90°, $\theta$=90° is 0.67-1.23 dBi and −0.59-1 dBi for 2.4- and 5-GHz bands, respectively. FIG. 22*b* also shows the simulated and measured total efficiencies of the omnidirectional antenna 420*a* in the prototype of the MIMO antenna 440. With reference to FIG. 22*b*, the measured efficiencies of the two bands are ~85%, being lower than those (~90%) of the single element. The reduction in the efficiency is due to the tolerance of a separate fabrication in addition to the loss caused by the power absorption of the remaining three antenna elements.

Figure 23A:
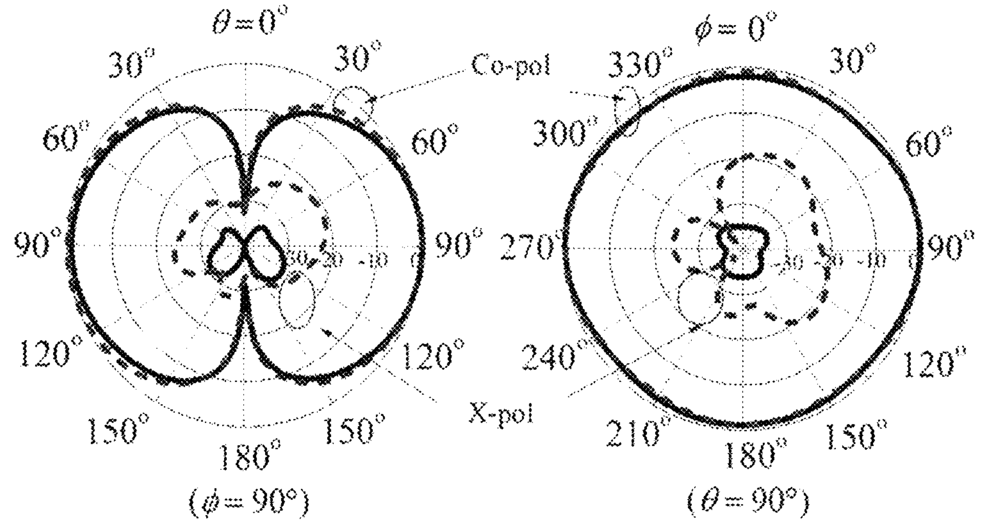
FIG. 23*a* shows simulated and measured normalized radiation patterns of element 1 in the dual-band omnidirectional MIMO antenna in FIG. 19 and its prototype at 2.44 GHz.
Figure 23B:
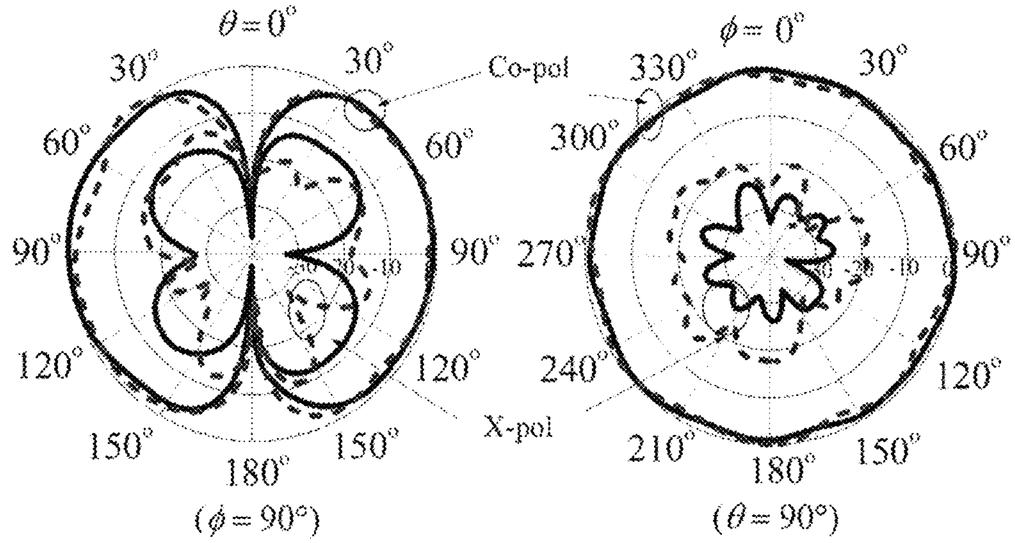
FIG. 23*b* shows simulated and measured normalized radiation patterns of element 1 in the dual-band omnidirectional MIMO antenna in FIG. 19 and its prototype at 5.2 GHz.
Figure 23C:
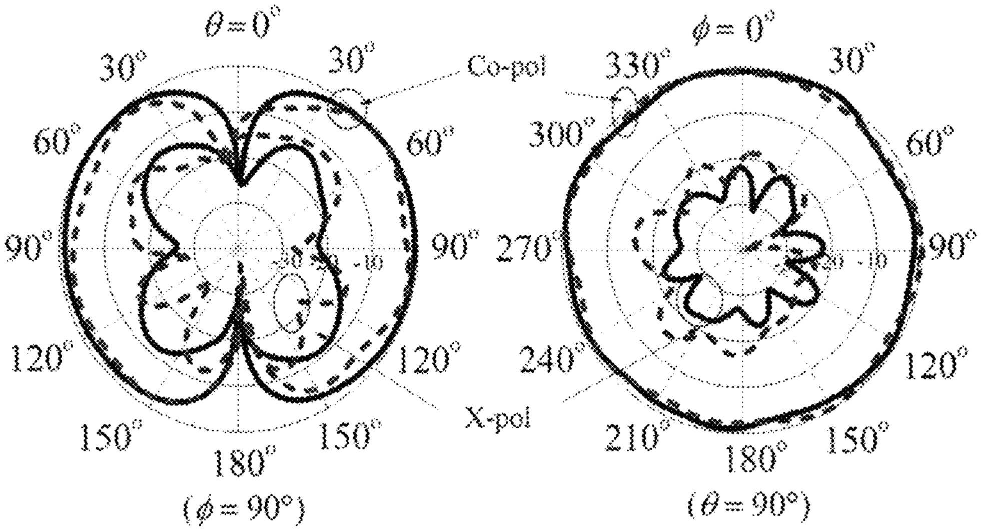
FIG. 23*c* shows simulated and measured normalized radiation patterns of element 1 in the dual-band omnidirectional MIMO antenna in FIG. 19 and its prototype at 5.8 GHz.

FIG. 23*a*, FIG. 23*b* and FIG. 23*c* show the simulated and measured radiation patterns of the omnidirectional antenna 420*a* in the prototype of the MIMO antenna 440 at 2.44 GHz, 5.2 GHz, and 5.8 GHz respectively. As can be observed from FIGS. 23*a*-23*c*, the simulated and measured results agree reasonably well with each other. Symmetric omnidirectional radiation patterns are obtained, as expected. The radiation patterns at other frequencies were simulated and found to be very stable across the two passbands. In the azimuthal plane, the measured gain variation is less than 3.2 dB at the three frequencies. The radiation patterns of other elements were found to be similar to those of the omnidirectional antenna 420*a*, as expected.

Figure 24:
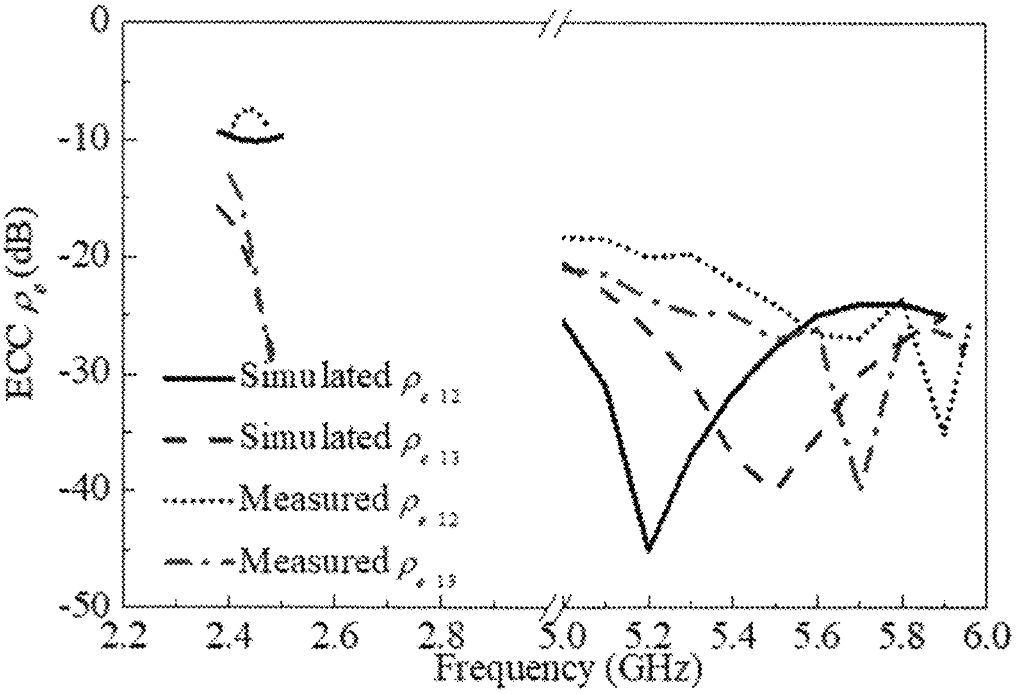
FIG. 24 shows measured and simulated ECCs of the dual-band omnidirectional MIMO antenna in FIG. 19 and its prototype.

FIG. 24 shows the simulated and measured envelope correlation coefficients (ECCs) $\rho_e$, which is a performance index for a MIMO antenna. The simulated and measured ECCs were obtained from the radiation fields. With reference to FIG. 24, both the simulated and measured ECCs between different elements are generally lower than −7.2 and −18 dB for the lower and upper bands, respectively, which are desirably much lower than the criteria of $\rho_e<-3$ dB.

TABLE 2

COMPARISON BETWEEN PROPOSED MIMO ANTENNA WITH REPORTED HORIZONTALLY POLARIZED OMNIDIRECTIONAL MIMO ANTENNAS

| Ref | Frequency band | Number of Ant. | Isolation (dB) | Polarization | Size | Azimuthally omnidirectional | Stable patterns | Gain variation | Efficiency |
|---|---|---|---|---|---|---|---|---|---|
| [31]# | D (2.25-3 GHz), (4-5.3 GHz) | 8 | 9 | HP | $0.49 \times 0.49\lambda_0^2$ | N | N | >20 | 60%-80% |
| [12] | S (3.78-4.07 GHz) | 2 | 17 | VP + HP | $1.26 \times 1.26\lambda_0^2$ | Y | Y | — | — |
| [24] | S (2.29-2.57 GHz) | 2 | 10 | HP | $0.92 \times 0.92\lambda_0^2$ | Y | Y | 3.4 | 50-75% |
| [32] | D (2.4, 5.5 GHz) | 3 | 10 | HP | $1.60 \times 1.60\lambda_0^2$ | Y | Y | 4.3 | — |
| Proposed MIMO | D (2.4-2.49 GHz), (5.1-5.88 GHz) | 4 | 16 | HP | $0.93 \times 0.93\lambda_0^2$ | Y | Y | 3.2 | 85% |

S: Single band, D: Dual band, $\lambda_0$: Wavelength in air at lowest operating frequency.
#The impedance bandwidth in [31] was found using $|S_{11}| \leq -6$ dB instead of $|S_{11}| \leq -10$ dB.

Table 2 summarizes the results of the MIMO antenna 440 (which is referred as the "proposed MIMO" in Table 2) and other HP omnidirectional MIMO antennas available in the art. As can be observed from Table 2, a small MIMO design with 8 elements has been reported in [31], but its radiation patterns are not omnidirectional in the azimuthal plane. Also, they are not stable across the operation bands. As compared with the omnidirectional MIMO antennas [12], [24], [32], the MIMO antenna 440 has the largest number of antenna elements and also the highest efficiency, with its size comparable to or even smaller than those of prior art designs.

One can see that according to one embodiment, the electrically small, planar, dual-band, horizontally polarized omnidirectional antenna with FR>2 has been designed. The antenna has combined a 2.4-GHz ES loop and a 5-GHz Alford loop on a single substrate. It has been shown that the two loops can work in their individual band independently, greatly facilitating the dual-band design. Four symmetrical radial strips have been used to excite the ES loop to reduce the gain variation in the azimuthal plane. To verify the simulation, a 2.4/5-GHz prototype for Wi-Fi applications was fabricated and tested. It has been found that the peak gain variations in the azimuthal plane are 0.5 dB and 1 dB in the lower band (2.4-2.5 GHz) and upper band (5.1-5.9 GHz), respectively. Although the dual-band antenna has a small diameter of $0.296\lambda_0$, it has a high total efficiency of ~90%. It has been found that the FR can be easily extended to 3.75 with the maximum gain variation in the azimuthal plane being 2 dB.

According to another embodiment of the invention, a 2×2 MIMO antenna has been obtained for Wi-Fi applications. The 4-element dual-band MIMO antenna has a compact size of 117×117 $mm^2$ $(0.93\times0.93)\lambda_0^2$ at 2.4 GHz). A prototype was also fabricated and measured. It has been found that the measured impedance bandwidths of the two bands are 3.9% (2.4-2.495 GHz) and 14.2% (5.1-5.88 GHz), covering the 2.4- and 5-GHz Wi-Fi bands. The measured isolations of the lower and upper bands are higher than 16 dB and 24.5 dB, respectively. It has been observed that the omnidirectional radiation patterns are stable across the two passbands. A gain variation of less than 3.2 dB has been found in the azimuthal plane. The ECCs of the two bands have been simulated and measured. It has been found that the measured ECCs, obtained from the radiation fields, are lower than −7.2 and −18 dB for the lower and upper passband, respectively.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

What is claimed is:

1. A dual-band horizontally polarized omnidirectional antenna, comprising:

a) an electrically small (ES) first omnidirectional loop antenna for a first band; and b) a second omnidirectional loop antenna for a second band;

wherein the first omnidirectional loop antenna and the second omnidirectional loop antenna are capable of operating independently in the first band and the second band; and a loading effect of the second omnidirectional loop antenna adapted to suppress a higher-order mode of the first omnidirectional loop antenna;

wherein the first omnidirectional loop antenna and the second omnidirectional loop antenna are configured respectively on opposite sides of a substrate;

wherein an ES loop of the first omnidirectional loop antenna is divided into a plurality of segments each of which is excited by a corresponding radial strip; the radial strips connected to a central patch; the plurality of segments divided by four interlaced coupling slots that provide capacitive loadings.

2. The dual-band HP omnidirectional antenna according to claim 1, wherein the plurality of segments being identical to each other; the radial strips being centrosymmetric around the central patch.

3. The dual-band HP omnidirectional antenna according to claim 1, wherein the second omnidirectional loop antenna comprises an Alford loop excited by a plurality of radial arms; the plurality of radial arms connected to a feeding probe at the center of Alford loop.

4. The dual-band HP omnidirectional antenna according to claim 3, wherein the second omnidirectional loop antenna further comprises an angular parasitic strip placed next to each angular strip of the Alford loop.

5. The dual-band HP omnidirectional antenna according to claim 3, wherein the radial arms for feeding the Alford loop are located in a same plane in which the second omnidirectional loop antenna is located.

6. An antenna array comprising a plurality of dual-band HP omnidirectional antennas according to claim 1.

7. The antenna array according to claim 6, comprises four said dual-band HP omnidirectional antennas; centers of each of the dual-band HP omnidirectional antennas forming a square shape.

8. The dual-band HP omnidirectional antenna according to claim 1, wherein the central patch forms a complete loop which is connected to each of the radial strips.

9. The dual-band HP omnidirectional antenna according to claim 1, wherein an upper end of the second band and an lower end of the first band has a ratio of being larger than 2.

10. The dual-band HP omnidirectional antenna according to claim 9, wherein the ratio is larger than 2.4.

11. The dual-band HP omnidirectional antenna according to claim 1, wherein the radial strips for feeding the ES loop are located in a same plane in which the first omnidirectional loop antenna is located.

12. A dual-band HP omnidirectional antenna, comprising:

a) an electrically small (ES) first omnidirectional loop antenna for a first band; and b) a second omnidirectional loop antenna for a second band;

wherein the first omnidirectional loop antenna and the second omnidirectional loop antenna are capable of operating independently in the first band and the second band; and a loading effect of the second omnidirectional loop antenna adapted to suppress a higher-order mode of the first omnidirectional loop antenna;

wherein the first omnidirectional loop antenna and the second omnidirectional loop antenna are configured respectively on opposite sides of a substrate;

wherein the second omnidirectional loop antenna comprises an Alford loop excited by a plurality of radial arms; the plurality of radial arms connected to a feeding probe at the center of Alford loop and each of the plurality of radial arms comprising a meander structure.

* * * * *